Inventors
Raymond L Ewald
Henry A. Skog

By Cox & Moore
attys.

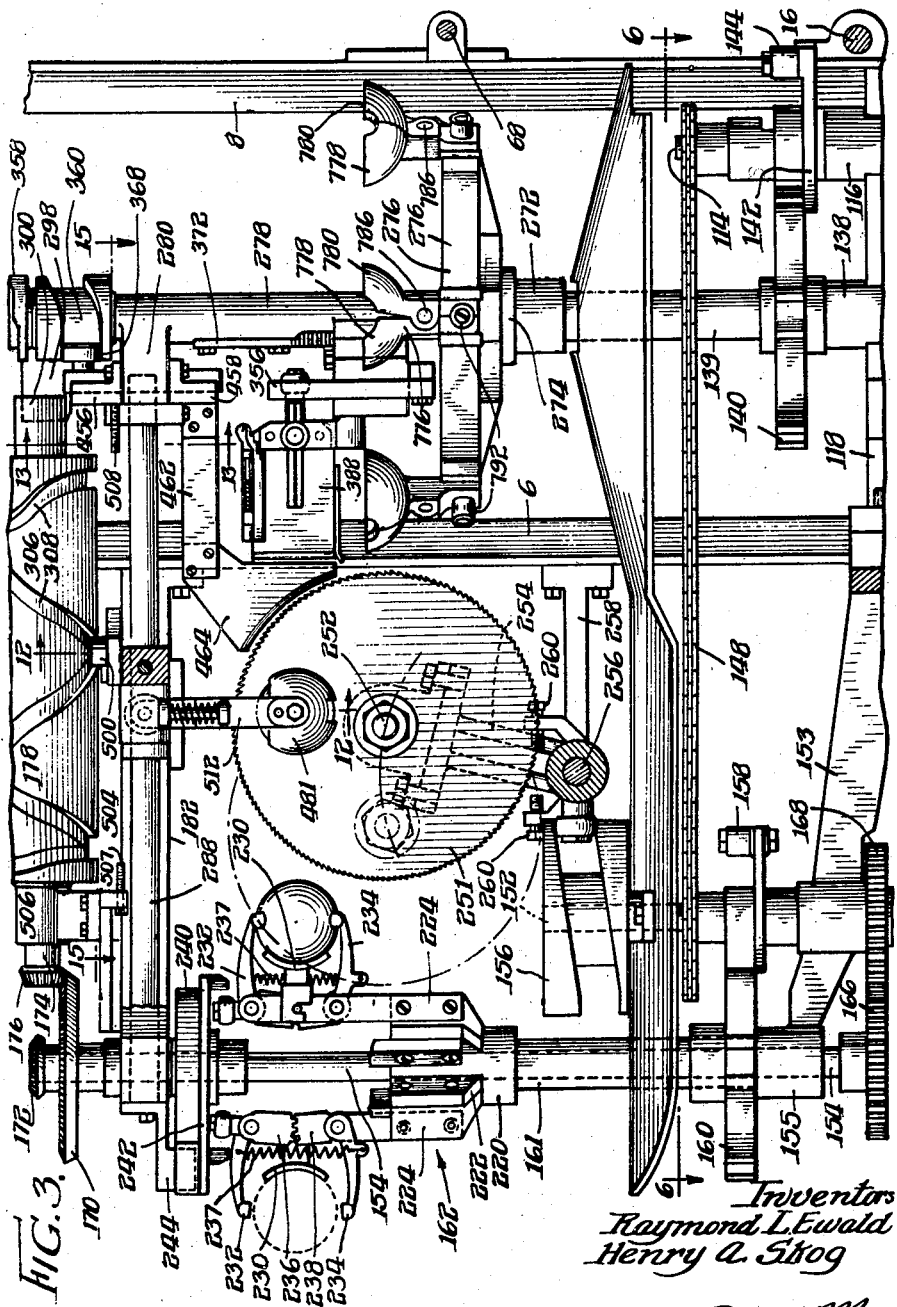

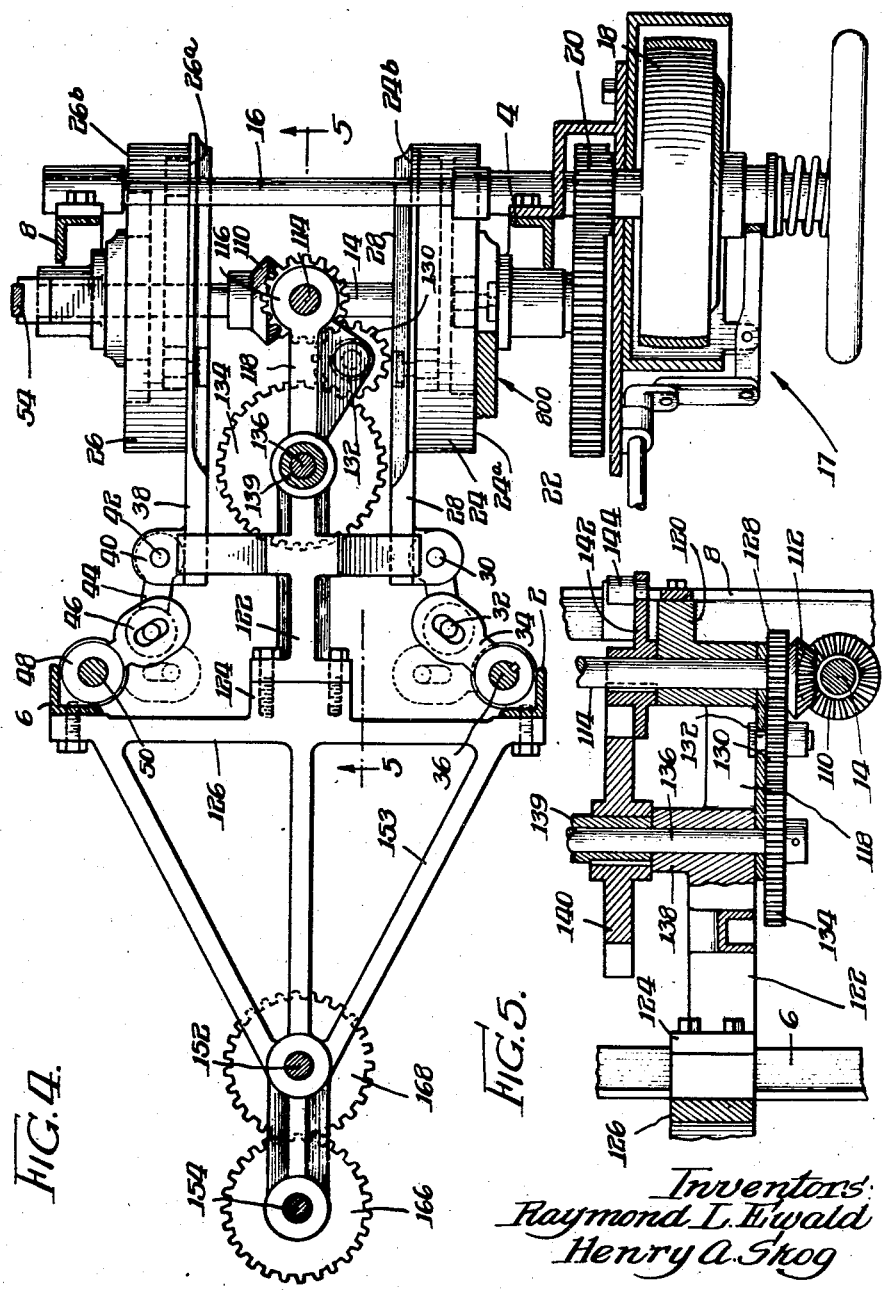

Inventors
Raymond L. Ewald
Henry A. Skog

By:- Cox & Moore
attys.

Dec. 7, 1943.  R. L. EWALD ET AL  2,335,849
FRUIT PEELING APPARATUS
Original Filed Jan. 17, 1938  17 Sheets-Sheet 6

Inventors
Raymond L. Ewald
Henry A. Skog
By:— Cox & Moore
Attys.

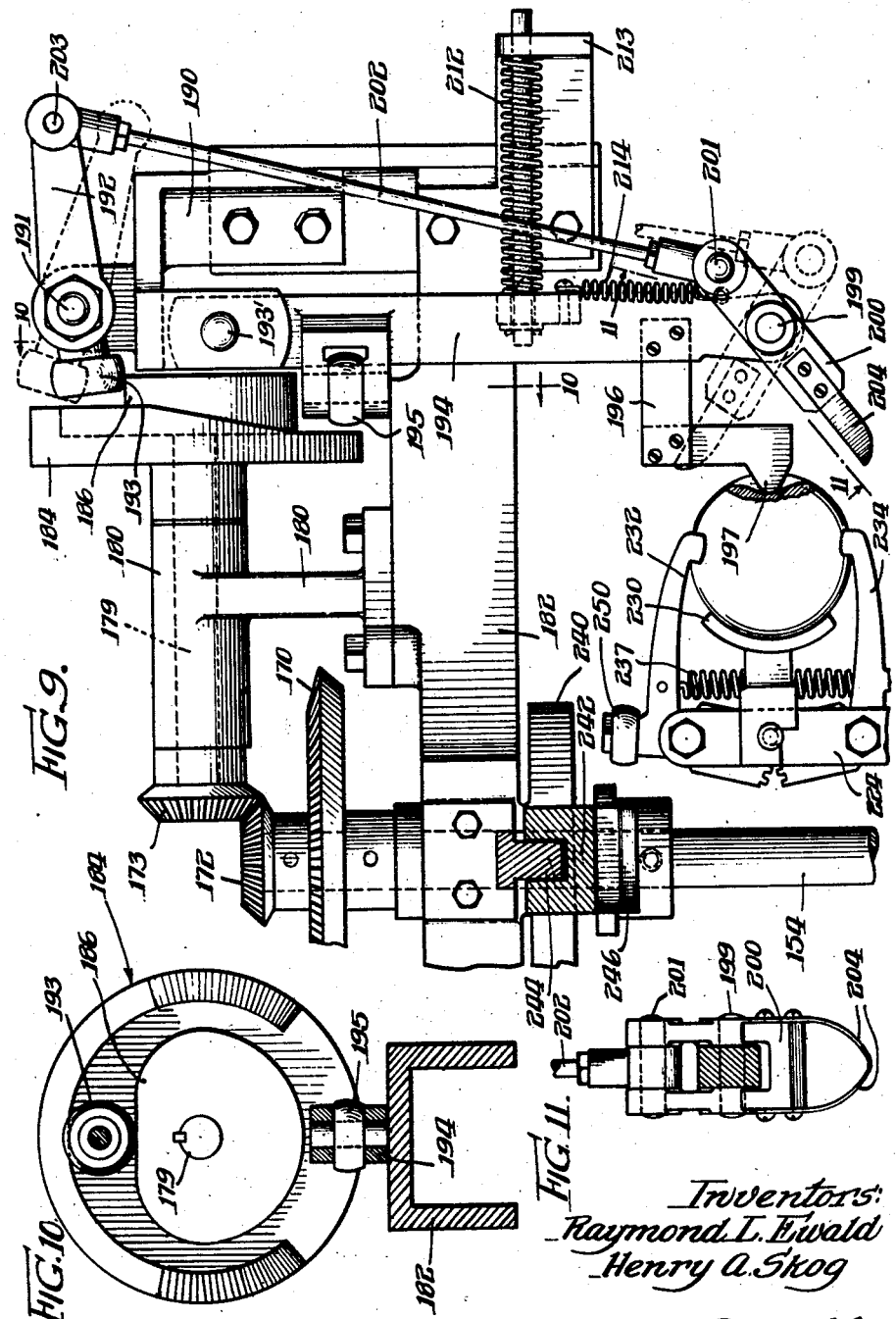

Dec. 7, 1943.   R. L. EWALD ET AL   2,335,849
FRUIT PEELING APPARATUS
Original Filed Jan. 17, 1938   17 Sheets-Sheet 8
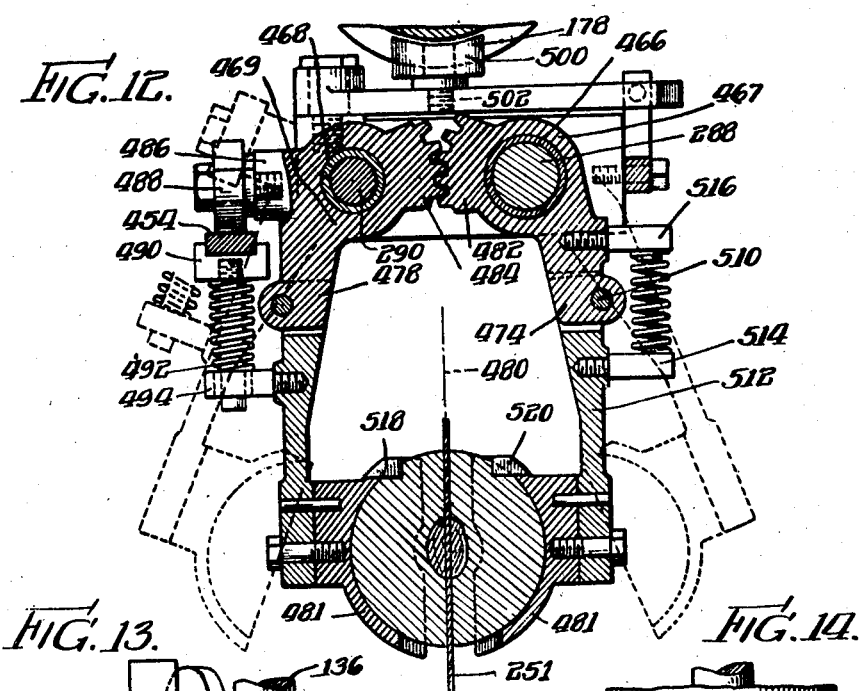
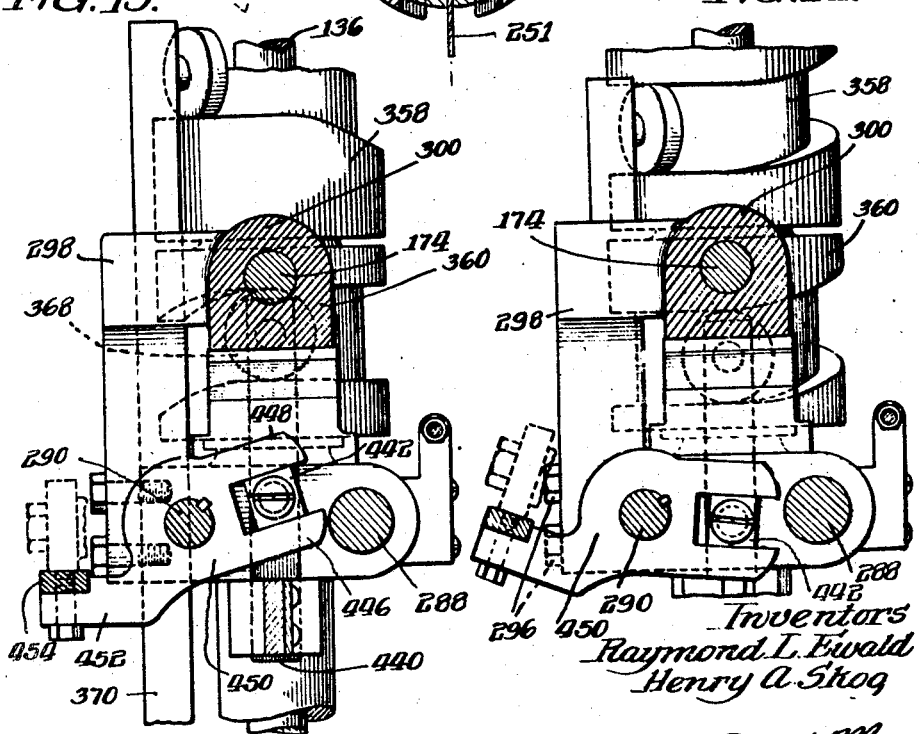
Inventors
Raymond L. Ewald
Henry A. Skog
By:- Cox & Moore
attys.

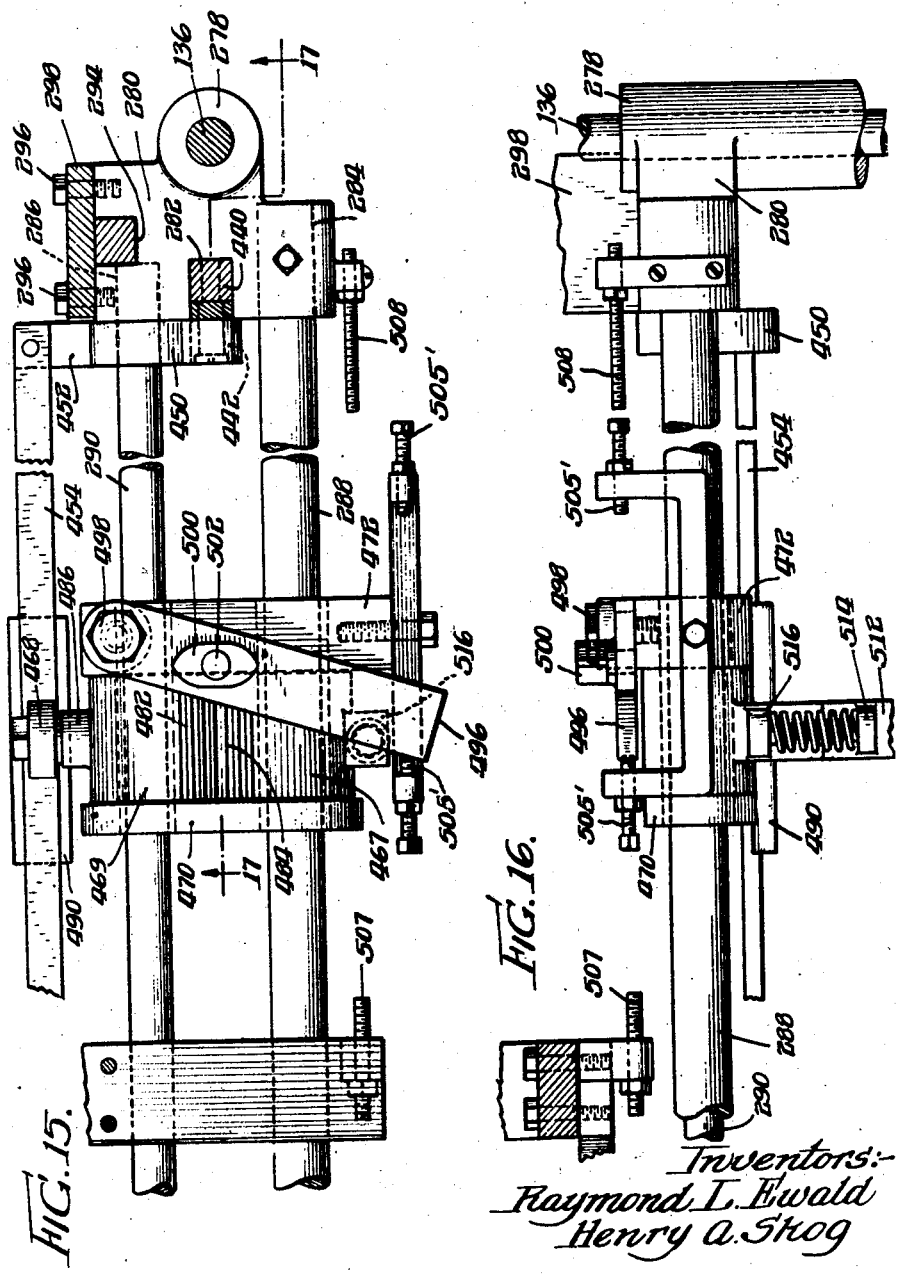

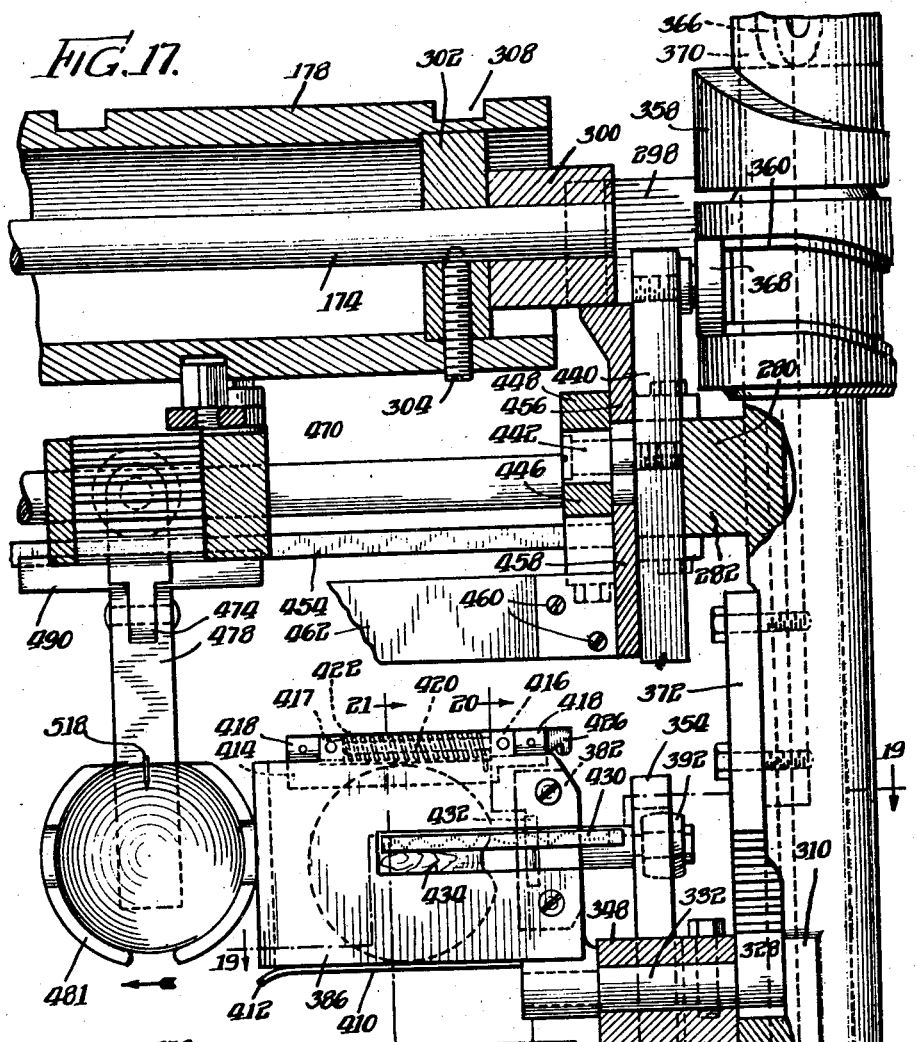
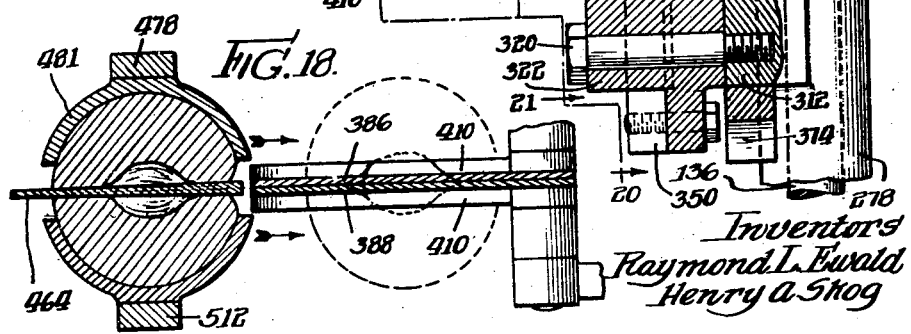

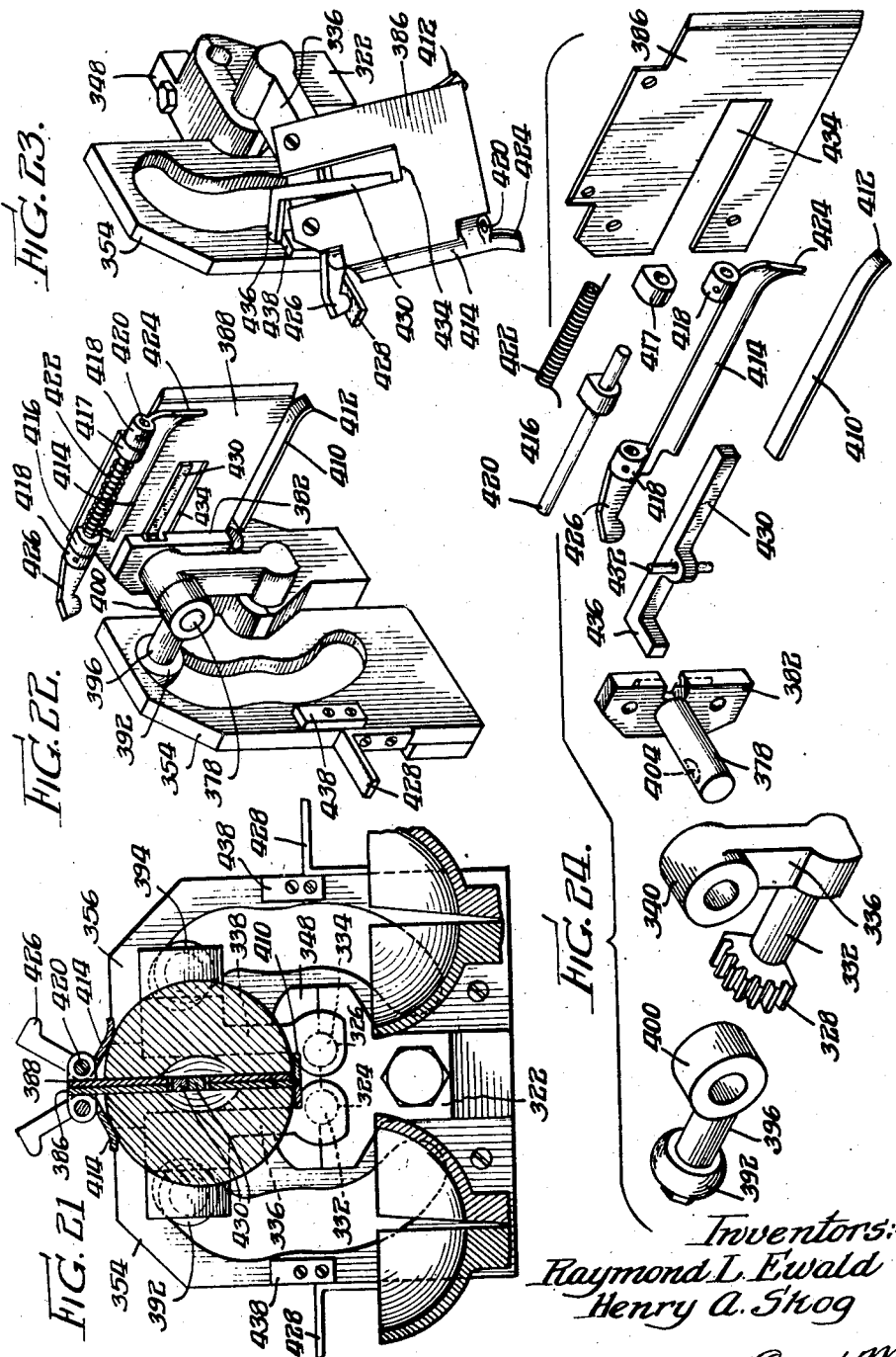

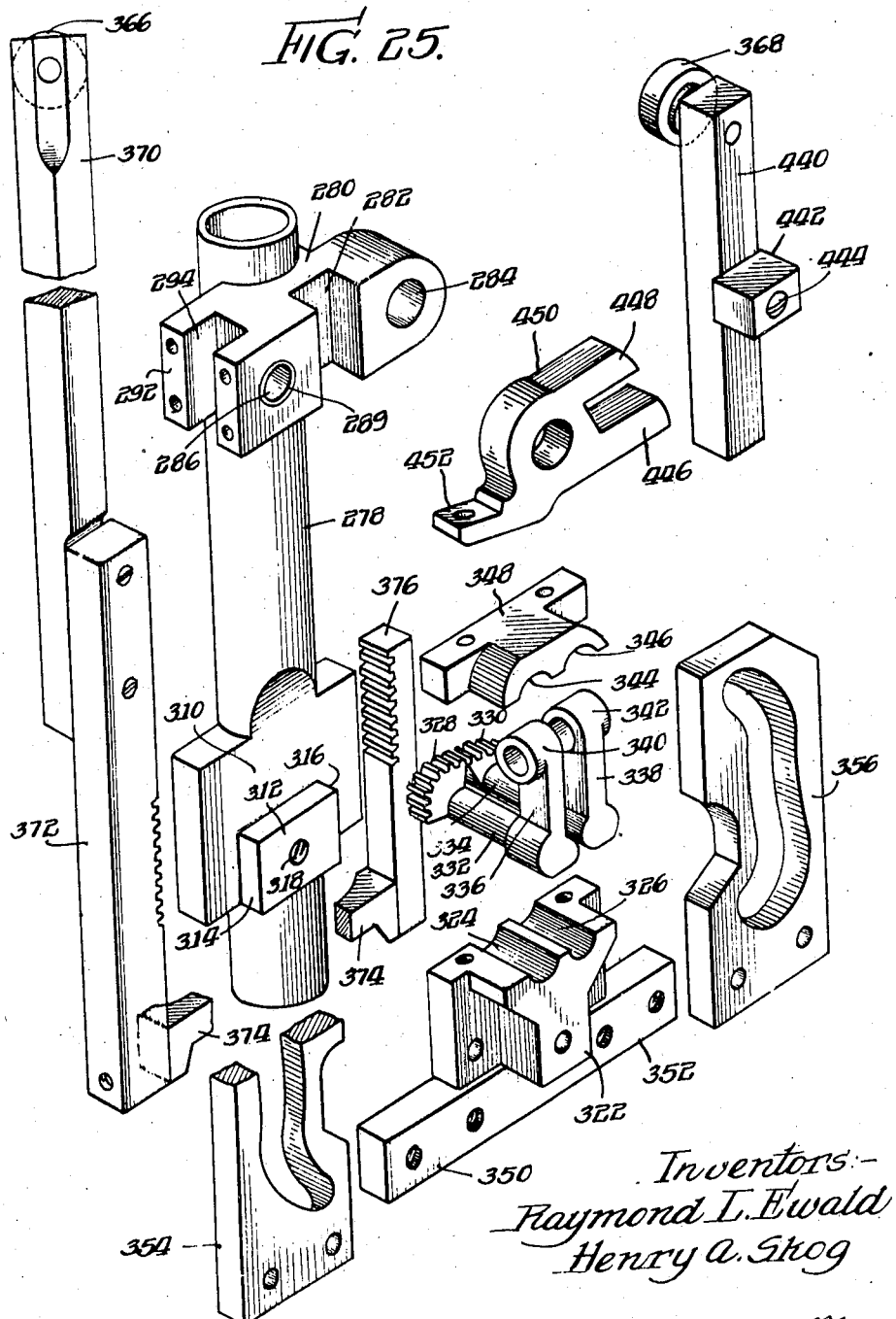

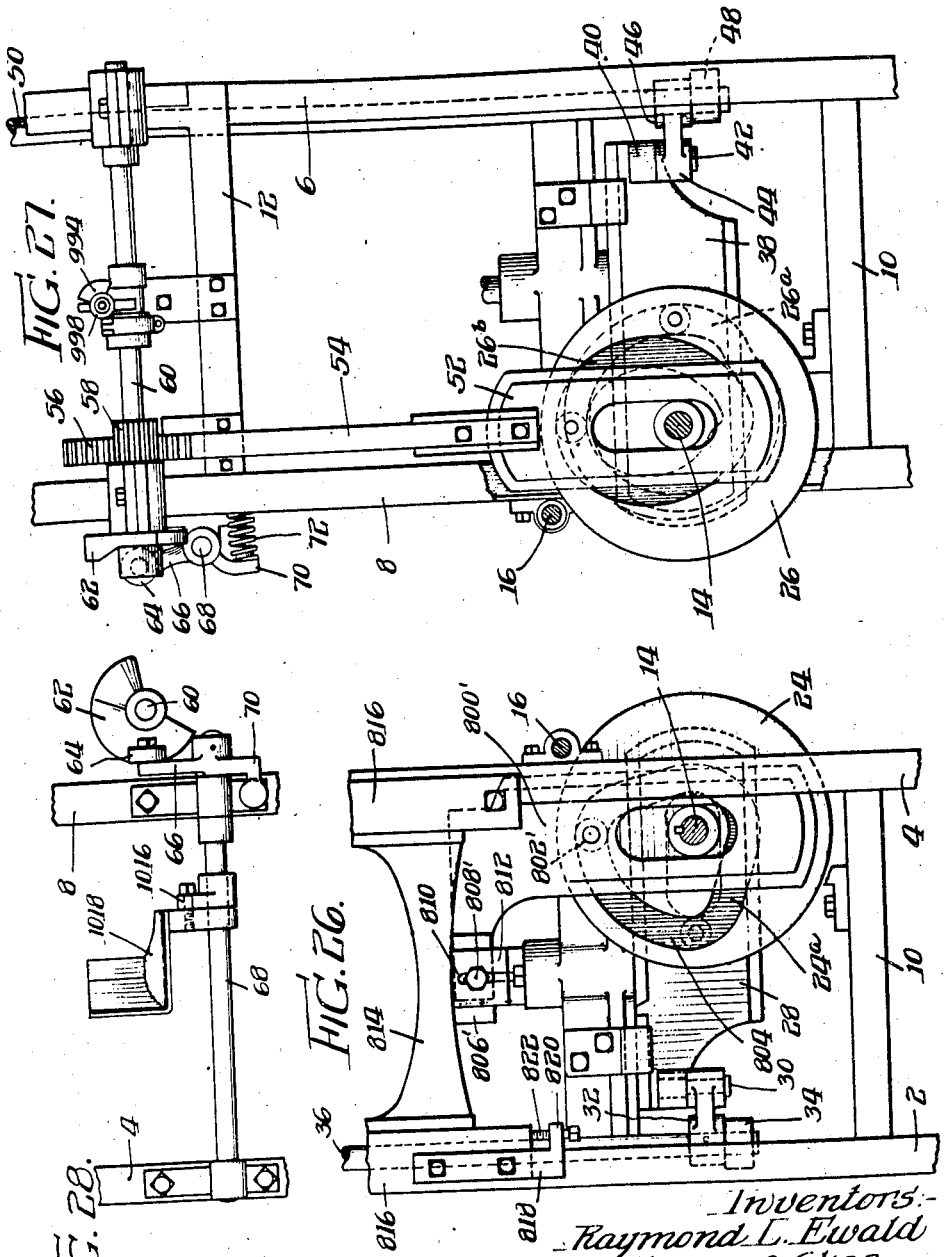

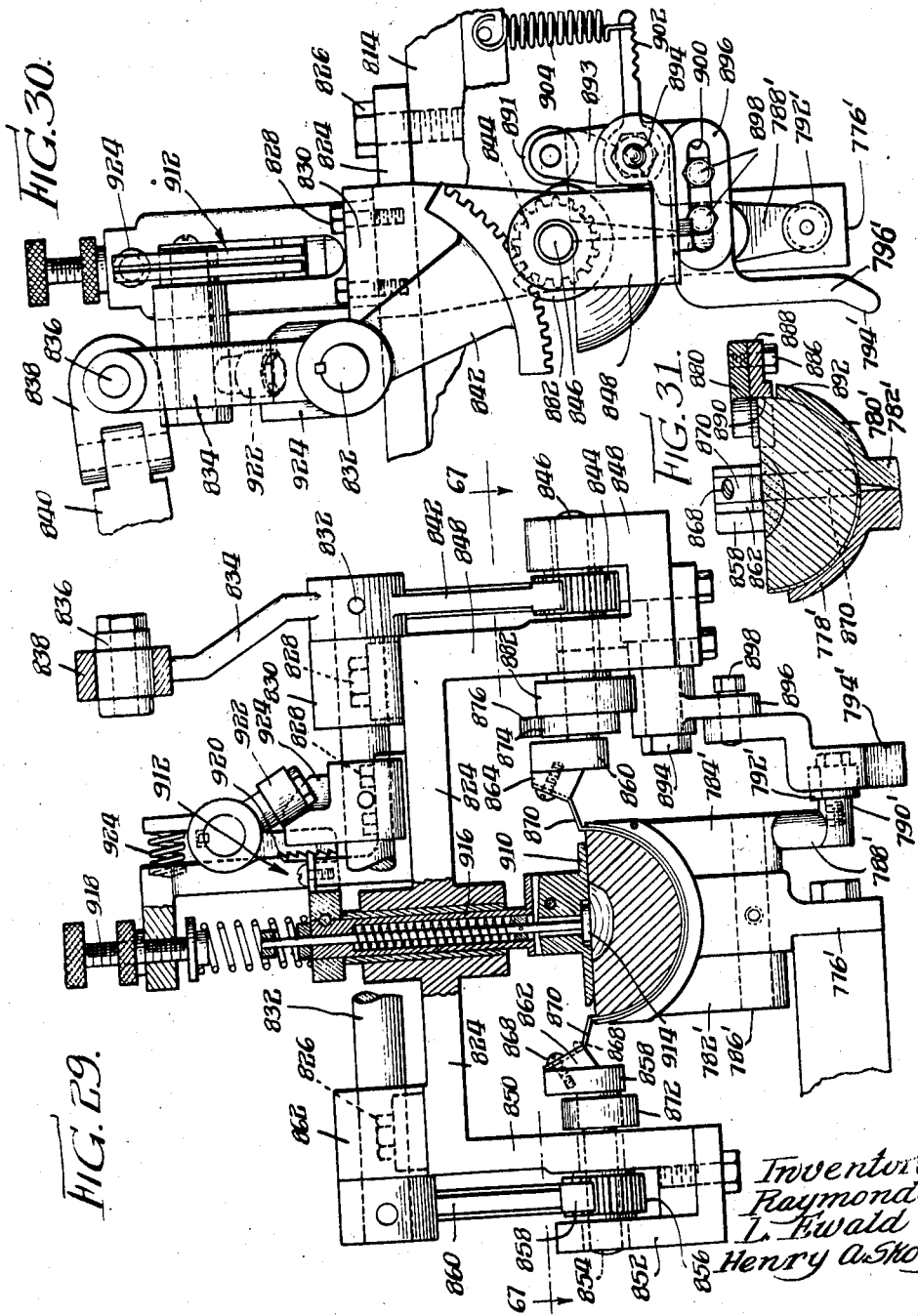

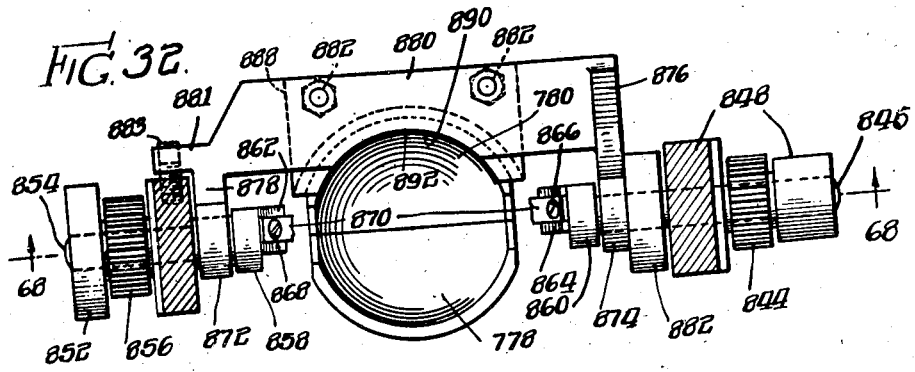
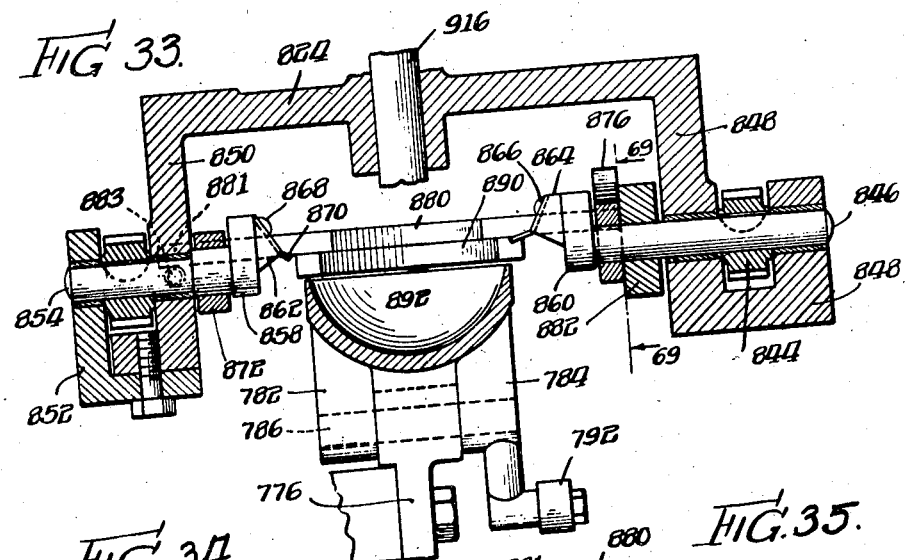
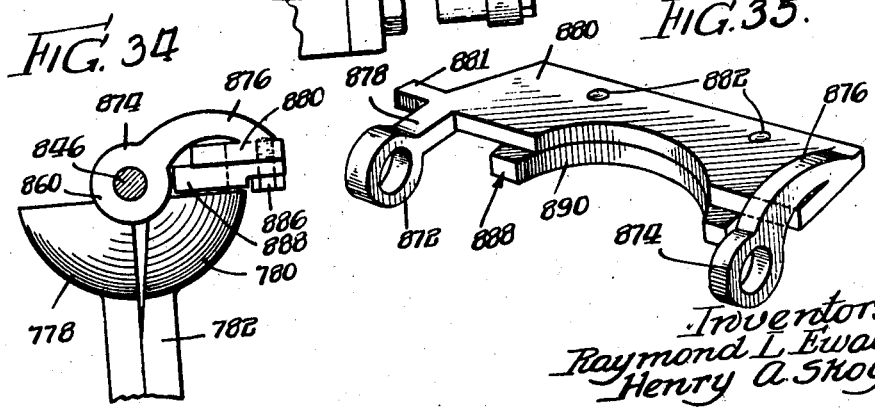

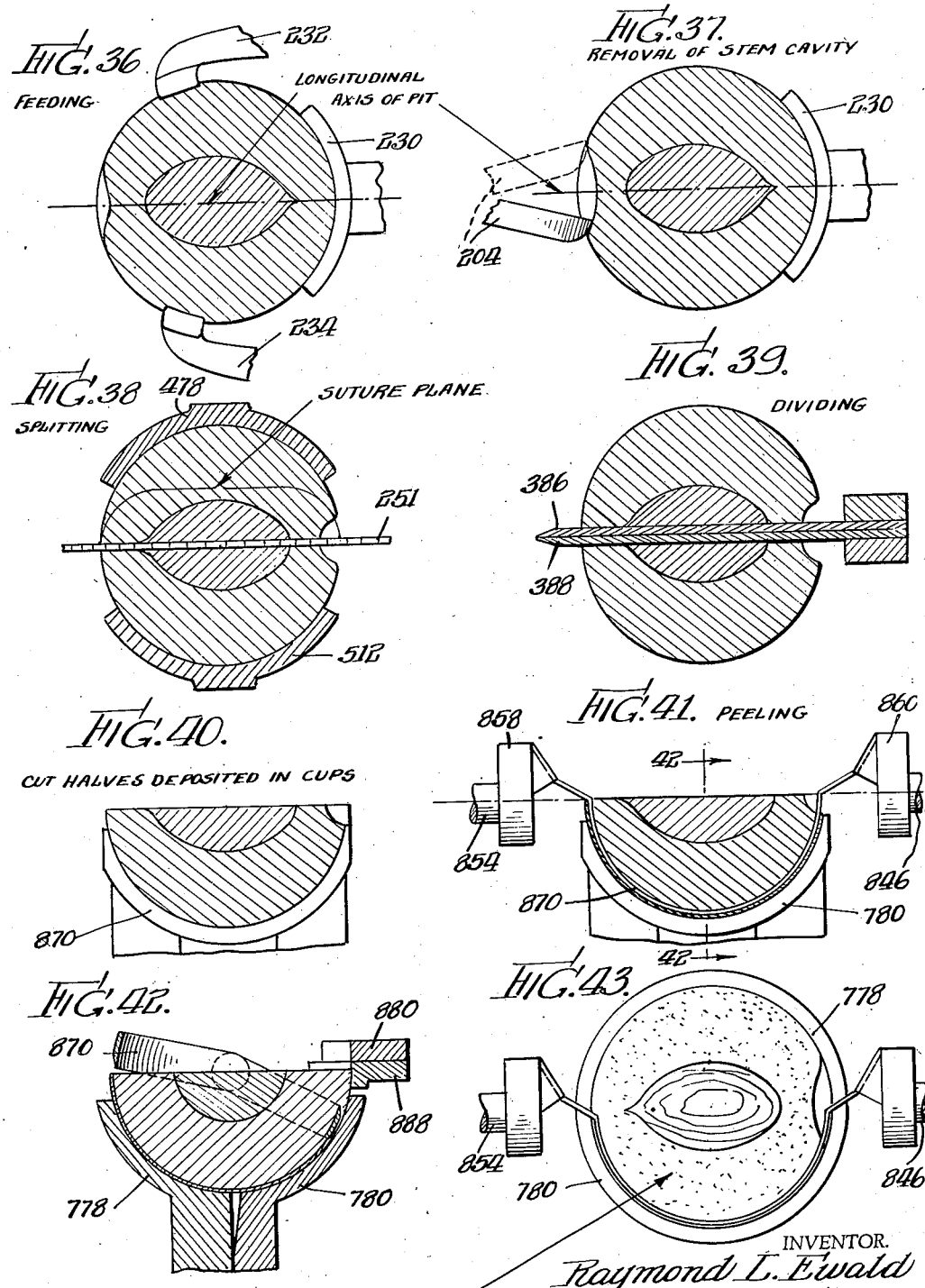

Patented Dec. 7, 1943

2,335,849

UNITED STATES PATENT OFFICE 2,335,849

FRUIT PEELING APPARATUS

Raymond L. Ewald and Henry A. Skog, Olympia, Wash., assignors to Special Equipment Company, Portland, Oreg., a corporation of Oregon Original application January 17, 1938, Serial No. 185,332. Divided and this application September 2, 1939, Serial No. 293,253

32 Claims. (Cl. 146—44)

This invention relates to fruit treating apparatus, and more particularly to an organized machine adapted to receive a whole fruit and automatically to process the fruit for canning purposes.

Among the objects of the present invention are to provide an organized, automatic machine particularly adapted for the processing of whole peaches, especially of the clingstone variety, which machine is adapted to halve and completely peel the peach without the use of lye, chemicals or water, and in such a manner as to preserve the natural color, appearance, odor and taste of the peach; to provide an automatic, organized machine for peeling a succession of half peaches irrespective of variations in size and shape of the peaches; to provide these and other objects of invention as will be apparent from a perusal of the following specification when taken in connection with the accompanying drawings.

Referring now to the drawings in detail:

Fig. 3 is a vertical section taken on line 3—3 of Fig. 2;

Fig. 4 is a plan sectional view taken on line 4—4 of Fig. 1, showing a part of the driving mechanism;

Fig. 5 is a sectional view taken on line 5—5 of Fig. 4, likewise showing a part of the driving mechanism;

Fig. 9 is a vertical sectional view of the means for cutting the peeling out of the stem end of the fruit, the view being taken on line 9—9 of Fig. 2;

Fig. 10 is a sectional view taken on line 10—10 of Fig. 9, the view showing the cams that operate the cutter knives and the fruit holding means;

Fig. 11 is a detail sectional view of a knife carrier, taken on line 11—11 of Fig. 9;

Fig. 12 is a detail sectional view of the fruit transfer arms, being taken on line 12—12 of Fig. 3;

Fig. 13 is a detail sectional view showing the means for operating the fruit transfer arms, the view being taken on line 13—13 of Fig. 3;

Fig. 14 is a view similar to Fig. 13, but showing the mechanism in a different operating position;

Fig. 15 is a plan sectional view taken on line 15—15 of Fig. 3, and showing the means for imparting an additional movement to the transfer jaw carriage;

Fig. 16 is a side view of the mechanism shown in Fig. 15;

Fig. 17 is a vertical sectional view taken on line 17—17 of Fig. 15 and showing the transfer arms and separating blades;

Fig. 18 is a detail plan sectional view showing the transfer arms approaching the separating blades, and also showing the fruit halves disposed upon the blades in dotted lines;

Fig. 21 is a sectional view taken on the line 21—21 of Fig. 17, showing the fruit disposed upon the separating blades;

Fig. 22 is a perspective view of one of the spreader means;

Fig. 23 is a view showing one of the spreaders in a downward position;

Fig. 24 is an exploded view of the parts of one of the spreaders and its operating means;

Fig. 25 is an exploded view of the mechanism for operating the fruit spreaders;

Fig. 26 is a fragmentary view of the lower portion of the right-hand end of the machine as viewed in Fig. 1, showing part of the actuating mechanism;

Fig. 27 is a fragmentary elevational view of the opposite side of the machine of that shown in Fig. 1, with a portion of the frame broken away;

Fig. 28 is a fragmentary view showing the mechanism for expelling the fruit from the machine;

Fig. 29 is a vertical sectional view taken on line 29—29 of Fig. 2, showing the peeling head;

Fig. 30 is a front elevational view of the peeling head as it appears in Fig. 29 when viewing it from the right;

Fig. 31 is a sectional view taken through one of the peeling cups, showing the means for extending one of the inner walls of the cup sections;

Fig. 32 is a plan sectional view of the fruit peeling mechanism;

Fig. 33 is a vertical sectional view of parts taken on line 33—33 of Fig. 32;

Fig. 34 is a side elevational view of the peeling cup assembly, being viewed from the left as shown in Fig. 33; and Fig. 35 is a perspective view of the fruit cup extension.

Figs. 36 to 43 are diagrammatic views showing the successive operations on the fruit.

Figure 1:
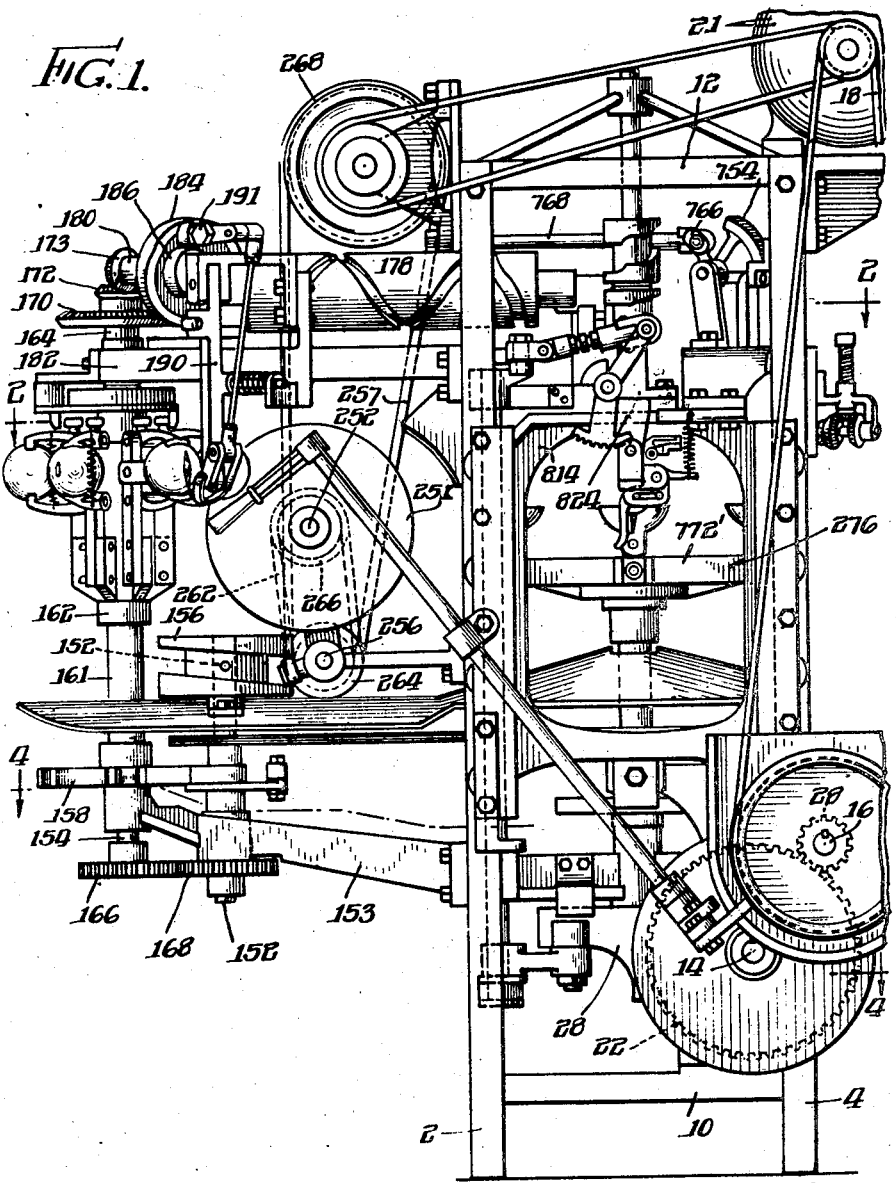
Fig. 1 shows a side elevation of one embodiment of the present invention, disclosing a completely automatic machine.

The present invention is best exemplified by reference to an organized, automatic machine adapted to receive a succession of whole fruit, such, for instance, as whole peaches, and particularly peaches of the clingstone variety, for continuously passing each of the succession of whole fruits through the machine; specifically, each whole fruit first has the peeling at its stem end removed; the whole peach is then split or divided substantially in half, which includes a division of the pit itself; the two halves are then automatically transferred onto spreader mechanism which deposits each half fruit into a fruit receiving means, which succession of fruit receiving means move past a peeling station where the peeling of each half fruit is automatically removed.

The present invention specifically relates to that divisible portion of the pending application of Raymond L. Ewald and Henry A. Skog, Serial No. 185,332, filed January 17, 1938, entitled "Fruit treating apparatus," which has matured into Patent No. 2,280,813, dated Apr. 28, 1942, relating to the peeling mechanism for automatically peeling the succession of half fruits, including means for automatically reinforcing one of the peripheral portions of each half fruit adjacent the cut face during the peeling operation.

It is to be understood that while the present invention is peculiarly adapted for the treatment of peaches, certain aspects of the invention are not to be specifically limited thereto but are capable of application to other types of fruit.

Description of machine

In order to exemplify various features of not only the broad but narrower aspects of the present invention, the same is described as applied to a type of machine disclosed in the drawings. It is, however, understood that such machine is but one form of the many different embodiments the invention is capable of taking, and that such illustration and disclosure is purely by way of illustration and not by way of limitation.

The machine of the present construction preferably takes the form of an upright, substantially square frame comprising four corner posts or angle irons 2, 4, 6 and 8, suitably braced at top and bottom by cross braces 10 and 12. In addition, other hereinafter described cross bars serve as rigid bracing for these upright members. In a general way, extending laterally from this rectangular frame, projects a supplementary frame adapted to be bolted or otherwise attached thereto, as clearly shown in Figs. 1, 4 and 6. This supplementary frame is utilized to support the mechanism which initially receives the fruit, the mechanism which cuts the fruit in halves and transports it to the peeling, pitting, fruit discharging and peel and pit scavenging mechanism, the latter mechanism being supported on the rectangular frame. A fuller description of this arrangement will be given subsequently.

The upright frame hereinafter described is provided on a relatively low level thereof with horizontally disposed shafts 14 and 16. Shaft 16 is power driven through clutch mechanism 17, which includes a drive pulley 18 adapted to be driven from any suitable motor 21 carried on a bracket mounted on the frame of the machine. The clutch mechanism 17 on the power drive is similar to that described in the pending applications of Mark Ewald and comprises purely a clutch for connecting and disconnecting the electric power source to the main operating shaft of the machine, and no portion of the present invention is concerned with the details of the clutch mechanism.

Shaft 16 carries a gear 20 driving another gear 22 on the horizontal shaft 14. This shaft 14 carries two main cams 24 and 26 fixed on opposite ends thereof. Each of these cams is double faced so as to provide cam operating means on the two opposed faces of each cam. Cam face 24a comprises a cam track in which operates a roller, hereinafter described, of a vertically reciprocable slide for raising and lowering the main tool carrying slide, hereinafter described. Cam face 24b forms a roller race in which a roller on a horizontally reciprocable slide 28 shifts in a horizontal motion transversely of shaft 14, and carries on its outer end a bearing pivot 30 linked to a bearing pivot 32 on an arm 34 fixed on a vertical shaft 36 having fixed bearings in the corner frame 2 of the main upright frame of the machine. This vertical shaft 36 is oscillated by the slide 28 for operating the peeling mechanism hereinafter described and also for operating the fruit discharging mechanism hereinafter described by means of cranks fixed to the upper end of this vertical oscillatable shaft 36.

The cam 26 on shaft 14 has a cam face 26a formed as a cam race in which operates a roller on a somewhat similar horizontal reciprocable slide 38 and corresponding to slide 28, which slide 38 is also provided on its outer end with a bearing 40 for a vertical pin 42, to the lower end of which is pivoted a link 44. This link 44 carries at its outer end a link 46, the outer bearing 48 of which is pinned to a vertically oscillatable shaft 50 which is mounted in the corner post 6 of the frame and in an opposite manner to the vertical shaft 36. This shaft 50 carries on its upper end a fixed arm hereinafter referred to, which in turn pivotally connects at its outer end to a relatively long rod running diagonally across to a universal connection in turn connected to mechanism which operates a gear sector reciprocable on a horizontal axis for operating the mechanism which actuates the pitting knives, all as will be hereinafter set forth.

Cam race 26b operates a vertically reciprocable slide 52 (see Fig. 27), the upper end of which is provided with a rod 54 having a rack tooth portion 56 operating a pinion 58 on a horizontal shaft 60. This shaft 60 is oscillated by the rack and pinion to operate a cam 62 on the outer end of this shaft, which in turn is adapted through the instrumentality of a roller 64, mounted on a pivoted arm 66 to operate a horizontal shaft 68 having bearings on the outside of the vertical frame member and on a level of the main fruit cup turret, hereinafter described, and above the lower levels of the machine that carry the shafts 14 and 16.

The arm 66 which is carried by the shaft 68 has an extending portion 70 which engages a spring 72 mounted between it and the corner post of the main frame for normally pressing the roller 64 toward the cam 62. The shaft 68 operates the mechanism for (a) positioning the rubber pad over the fruit cup for vertically holding the peel therein, and for (b) oscillating the fruit discharge trough, preferably carrying this rubber pad. These mechanisms (a) and (b) will hereinafter be more fully set forth.

Figure 2:
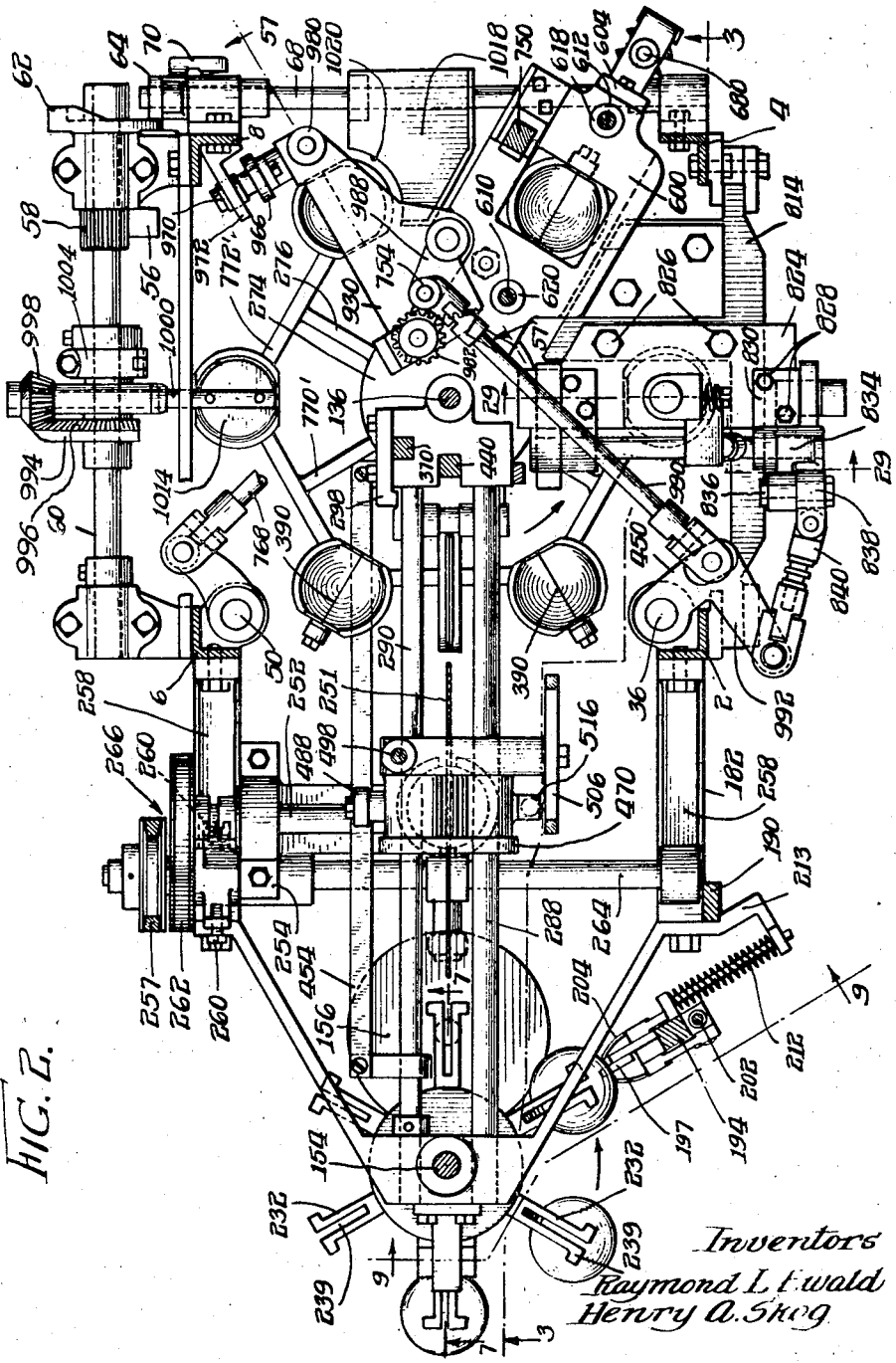
Fig. 2 is a plan sectional view taken on line 2—2 of Fig. 1.

As clearly shown in Fig. 2, the present machine provides a greater number of stations and operations than prior types of machines disclosed in the patents and pending applications of Mark Ewald. While the present invention is not limited to a machine having the exact sequence of apparatus for performing the different operations upon the fruit passing through the machine, the present disclosed arrangement is particularly desirable for the automatic treatment and processing of peaches and in the disclosed sequence of stations and operations. In the present instance these operations include:

1. A whole fruit feed station.
2. A peach stem cavity cutter and peeler.
3. A whole peach dividing and transfer station.
4. A spreader station where the cut halves are deposited in the half fruit receptacles on the main intermittently rotating turret mechanism.
5. A peeling station.

In the present organized machine, particularly as distinguished from the prior Ewald type of machine, it is not practicable to discharge the half fruit from the machine at the same station at which the seed-containing section is severed. This therefore resulted in the provision of a separate station for effecting this half fruit discharge. This in turn has made desirable a six half-fruit-holder turret instead of a four as heretofore provided. This six holder arrangement for the half fruit in turn makes desirable the disposition of single half fruit holders radially of the turret instead of in parallel pairs as heretofore; and this in turn, in conjunction with the six fruit holder feed-in turret for the whole fruit, requires means for spreading the fruit halves forming a parallel position of the suture axes of the severed halves of a fruit to a position where such suture axes converge and lie radially of the axis of the second turret, which has demanded a different motion of the half fruit spreaders as distinct from the single arcuate swing in the prior Ewald devices plus provision of means for driving the half fruit turret at twice the speed of the whole fruit turret whereby each half fruit holder of the latter turret is shifted say one hundred twenty degrees intermittently as the corresponding whole fruit holder is shifted sixty degrees to provide two spaced adjacent empty holders to receive the split halves of a whole fruit from each of the single holders of the whole fruit turret.

A second level of the main rectangular frame of the machine, bounded by the uprights 2, 4, 6, and 8, provides a location for the Geneva gears for driving the main half fruit holding turret and also the whole fruit feed turret, including the driving means therebetween, whereby the main half fruit holder turret is driven twice as fast as the whole fruit feed-in turret. For effecting this function, shaft 14 carries between its ends a bevel gear 110, see Fig. 4, meshing with a bevel gear 112 on a vertical shaft 114 mounted in a bearing 116 (Fig. 3) carried by a cross frame 118. This cross frame is supported at one end by suitable vertical bracing connected to a cross bar 120 (Fig. 5) carried by the vertical upright frame members 4 and 8. The opposite end 122 of cross frame 118 is bolted to an end support by a projection 124 from a horizontal cross bar 126 carried by the opposite vertical uprights 2 and 6 of the main frame at about the level of the cross frame 118. This cross bar 126 is preferably an integral part of the substantially triangular-shaped supplemental frame carrying the whole fruit feed-in turret and the transfer mechanism.

Shaft 114 carries a bevel gear 112 and also carries above it a gear 128, which latter meshes with a second gear 130 on a bearing 132 on the cross frame 118. Gear 130 meshes with a larger gear 134 horizontally fixed on a vertical turret shaft 136 having a bearing in cross frame 118. Turret shaft 136 is surrounded by a bearing 138, above which is a long sleeve 139 upon which is fixed a Geneva gear 140 having six slots, cooperating with a Geneva member 142 on shaft 114. This latter geneva 142 has the usual circular periphery provided with a roller 144 for cooperation with the six radial slots aforesaid, for rotating the Geneva wheel and sleeve 139 and for holding it stationary between partial turns. The upper end of shaft 114 above the Geneva member carries a sprocket gear 146 (see Fig. 6) driving a chain 148 running horizontally across the frame of the machine to a larger sprocket 150 fixed to shaft 152. This shaft 152 is mounted on a substantially triangular frame 153 carried by and integral with the cross bar 126. The outer end of frame 153 carries a bearing for the shaft 152 and also has a heavy extension bearing 155 (Fig. 3) for whole fruit turret shaft 154. Both of these shafts are vertical and parallel to each other. Shaft 152 extends upwardly a short distance and is provided on its upper end with a disc-like cam 156 of the tracker type, for operating the saw shifting mechanism. Whole fruit turret shaft 154 extends vertically upwardly toward the top of the frame and carries the whole fruit feed turret sleeve 161 rotatably mounted thereon, Fig. 3.

Shaft 152 at its lower end has a roller element 158 of a Geneva movement fixed to it, and sleeve 161 has a slotted element 160 of the cooperating Geneva part fixed to it. This slotted geneva has fixed to it the sleeve 161, see Fig. 3, which sleeve in turn carries the feed finger turret 162 provided with six whole fruit feed fingers.

The whole fruit feed-in station

Concentrically within sleeve 161 is the shaft 154, see Fig. 3, the lower end of which extends below the bearing 155, Fig. 3, and which has fixed thereto a gear 166 meshing with a gear 168 on the bottom end of shaft 152, whereby as the geneva 158 intermittently rotates the sleeve 161, the gears 166 and 168 rotate the shaft 154. The upper end of shaft 154 is provided with a crown gear 170 having radially extending peripheral teeth, and shaft 154 is also provided with a bevel gear 172. Crown gear 170 drives a shaft 174 through bevel gear 176, which shaft rotates an endless screw 178 for operating the fruit transfer mechanism, hereinafter described, while bevel gear 172, through another bevel gear 173, drives a horizontal shaft 179, see Fig. 9, rotating in a bearing 180 mounted on upper frame 182, which latter is a horizontal frame extension corresponding in general to the lower frame extension 153, see Fig. 4, and in which upper extension 182 the shaft 154 has a bearing.

The stem cavity cutter or peeler

Means is provided for automatically peeling or cutting the peel of the whole peach within the cavity in which the stem is located. Referring to Figs. 9, 10 and 11, on the opposite end of shaft 179 is fixed a compound cam comprising a large cam disc 184 having a peripheral high and low edge and a concentric, cylindrical cam 186. On a support 190 mounted on frame 182 is pivoted, as at 191, a lever 192 having a cam roll 193 rotatable thereon, and adapted to cooperate with the edge of cam 186 for pivotally shifting lever 192 in a vertical plane. Pivoted at 193' to mounting 190 is a long lever 194, the lower end of which carries a substantially L-shaped arm 196 having a nose or holder 197 adapted to enter the stem indentation or cavity of the whole peach as the latter is held by the whole fruit feed mechanism hereinafter described, and is thereby brought opposite to and held by the feed fingers of said feed mechanism. The upper end of arm 194 below its pivot 193' is provided with a roller 195 adapted to be contacted by a lateral edge of cam disc 184 for shifting this lever 194 toward and from the feed fingers of the whole fruit feed turret. The lower end of arm 194 is also provided with a pivot 199 on which swings another arm 200, the rear end of which has a pivotal connection 201 with a rod 202. This rod 202 pivots at 203 to the rear end of the lever 192. The front end of lever 200 is provided with any desired means for cutting the peel within the stem cavity. In the present form this means includes opposed blades 204 spaced apart about one-eighth inch to allow the points to pass either the holder 197 or the end of the pit, depending upon the depth of the cut. By the foregoing mechanism, when a peach or similar fruit is fed or positioned with its stem indentation opposite the nose 197, and when the latter is swung outwardly to enter the indentation, the lever 200 will be automatically swung upwardly, carrying the knives 204 through the cavity and form opposed, spaced cuts thereacross to cut the peel free from such indentation, and particularly when the subsequent peeling operation is carried out as hereinafter will be described.

The rear of lever 194 has a coiled spring 212 abutting thereagainst, which also acts against a fixed arm 213 on support 190 for returning the lever 194 resiliently to press the nose 197 into the stem cavity of the whole peach. In addition, a coiled spring 214 connected to the rear end of lever 200 serves to pull the knives 204 downwardly after the cutting operation.

*The whole fruit feed-in turret*

Means is provided whereby an operator may feed whole peaches one at a time to the feed-in turret, and this feed-in means preferably comprises a plurality of conveying means, specifically, relatively movable fingers which are adapted to grasp the curved surface of each of the whole peaches and to convey them to the splitting or dividing station as hereinafter described. Whole peaches are of varying shapes. Some are lop-sided with respect to the plane of the suture, others are symmetrical with respect to the plane of the suture. In the great majority of cases the maximum diameter of the pit of the peach is in the plane of the suture; in a smaller percentage of whole peaches, the maximum diameter of the pit may be positioned to one side of the plane of the suture. In any event, it is desirable to cleave or cut through the flesh of the fruit and also the pit in a plane parallel with the plane of the maximum diameter of the pit. The feed-in turret for the whole peaches, in the present invention, is constructed and arranged so that whole peaches are positioned in the holding mechanism of the feed-in turret in such a way that the plane of the maximum diameter of the peach, irrespective of the plane of the suture, is centrally located with respect to the grasping or holding means of the feed-in turret whereby when the feed-in turret is intermittently moved to the peach dividing position, the plane of operation of the dividing mechanism will be parallel with the plane of the maximum diameter of the pit. In the present instance, also, the feed-in turret and dividing station are constructed and arranged so that the peach, together with its whole pit, is divided while the whole peach is held within the grasping means of the turret and in such a manner that the contacting pressure of the grasping means is disposed on opposite sides of the peach dividing means and relatively close to the line of cleavage whereby any lateral pressure of the grasping means in holding the peach during the cleaving operation is avoided, and whereby a clean cut is effected. In addition, the peach is positioned and held in the holding means of the turret with preferably the longer axis of the pit disposed horizontally and also radially of the axis 154 of the turret.

Figure 7:
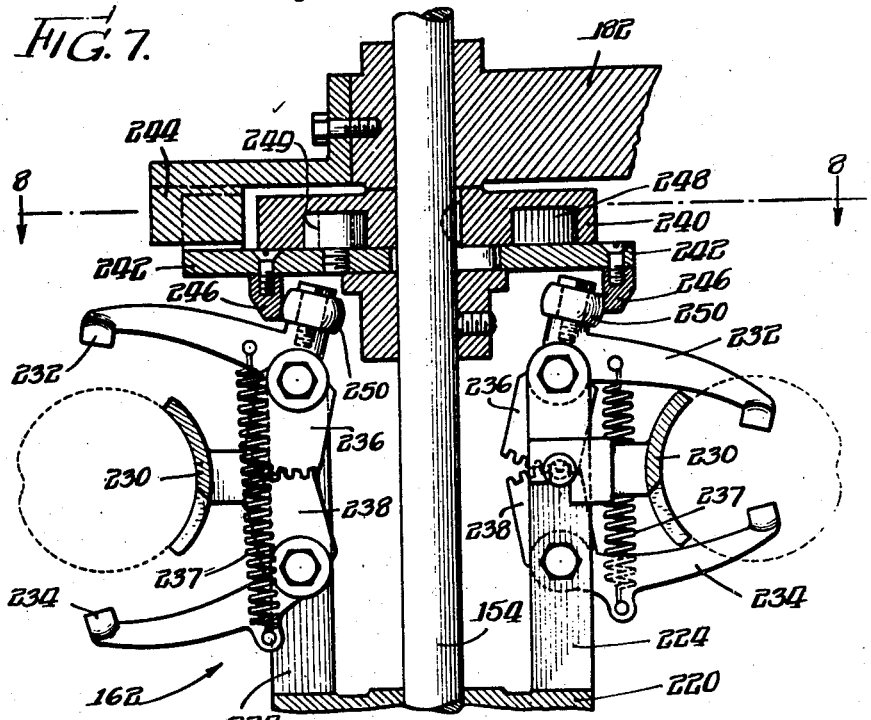
Fig. 7 is a vertical sectional view taken on line 7—7 of Fig. 2, showing the feed turret.
Figure 8:
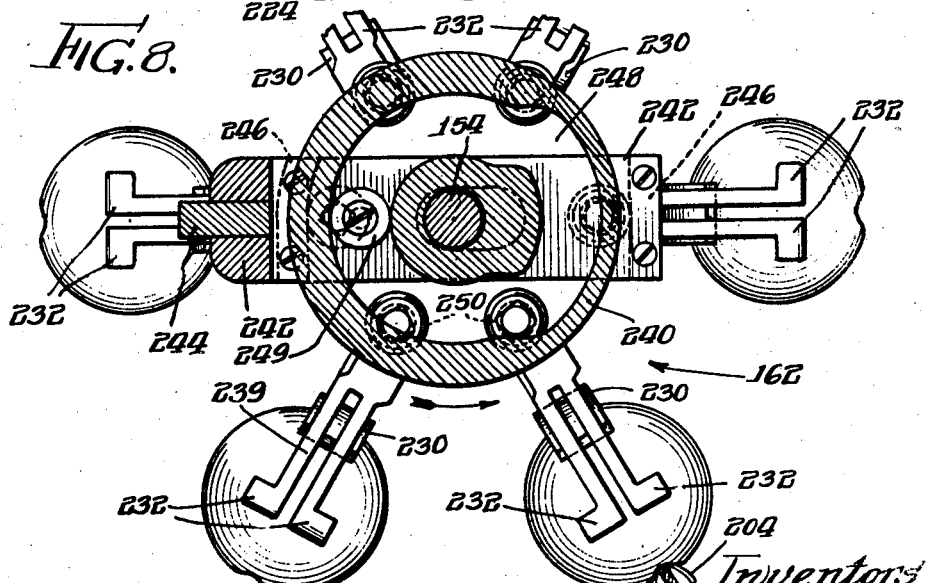
Fig. 8 is a plan sectional view of the feed turret, taken on line 8—8 of Fig. 7.

Referring now to the specific mechanism for accomplishing the foregoing and other functions, fixed on the upper end of sleeve 161, see Figures 3 and 7, is a feed head comprising a second sleeve 220 having in the present instance six radially disposed outstanding lugs 222, to each of which is fixed upstanding support bars 224 carrying the relatively shiftable feed fingers which comprise the whole peach holding means. Each feed finger device includes a relatively fixed replaceable holder or finger 230, which finger may be of varying sizes and suitably curved to receive and position the butt end or blossom end of the whole peach. Any suitable means may be provided for detachably holding the finger 230 in place. In addition there are upper and lower fingers 232 and 234, each having an integral toothed sector 236 and 238, respectively, intermeshing to provide simultaneous opening and closing action. A spring 237 connecting the arms 232 and 234 normally tends to bring the fingers to relatively closed position whereby to hold the whole fruit therebetween. As shown more clearly in Figures 2 and 8, each of these fingers is provided with radially extending slots 239 which extend back for substantially the entire length of the fingers whereby to permit the saw or cutting means, hereinafter referred to, to pass substantially through an entire whole fruit and completely to cut the pit of the whole fruit while the whole fruit is held stationarily between these fingers 232 and 234. It will be noted that these slots 239 substantially provide divided fingers which engage the whole fruit laterally and adjacent the line of cut so that the whole fruit is held substantially at the line of cut and not by any means that tends to press at an angle to and particularly at a right angle to the plane of action of the cutting means. It is important that the minimum lateral pressure be exerted on the whole fruit during the sawing action of the pit. This lateral pressure tends to press together the flesh of the fruit during the cutting action, and what is more important, tends to make jagged cuts in the marginal edges of the peach during the severance of the pit. This tends seriously to impair the appearance of the half peach sections during subsequent pitting, and tends to embed the slivers of pit into the flesh of the fruit, thereby impairing its flavor, appearance and quality.

Means is provided for positively opening the fingers and for permitting the spring resiliently to close these fingers whereby to engage and releasably hold the whole fruit therebetween during the cutting or sawing operation of the peach and whereby also to hold the two severed halves and to permit them to be grasped and transferred to the mechanism for depositing each half into a holding means, herein specifically illustrated as a cup. Beneath the support extension frame 182 and keyed on the upper end of shaft 154 is a cam 240. Below this cam is slidably disposed a cross slide 242 guided by a lug 244 on the under side of frame 182. This slide 242 has two depending lugs 246 forming extensions thereof and which lugs are 180 degrees apart. Cam 240 is provided with a cam race 248 which extends approximately 360 degrees of the total annular travel of the cam 240. Cam slide 242 has a roller 249 pivoted on its upper surface which runs in the cam race 248 on the under side of cam 240 to shift the slide 242 back and forth with a straight-line motion. When this slide 242 is moved toward the feed-in station of the machine, i. e., away from the pitting station, the depending lug 246 nearest the pitting station moves toward the feed-in station end, and thereby pushes the roll 250 on the top of the upper finger 232, see Fig. 7, inwardly toward the shaft 154 to open the fingers 232, 234. At the same time, the lug 246 which is spaced 180 degrees therefrom moves in the same direction to permit the spring 237 to close the oppositely located fingers and thereby hold the whole fruit between the fingers. The whole fruit, which is herein illustrated as a whole peach, is thus fed in step-by-step rotation of the feed turret, which carries the peach first to the stem cavity cutter for trimming the stem indentation and thence to the dividing or sawing station, at which station the feed fingers 232 and 234 are positively opened by a cross slide lug 246 in properly timed relation to permit the transfer fingers, hereinafter mentioned, to grasp and carry the severed halves or substantially severed halves of the peach from the sawing or dividing station to the spreading mechanism hereinafter mentioned.

By means of the foregoing mechanism, once the whole peach is placed manually with its suture line in a plane parallel with the plane of action of the rotary saw and with the maximum diameter of the peach placed centrally of the fingers 232 and 234, the whole peach will be firmly held in such position by these fingers and with the longitudinal axis of the pit extending radially of the turret. Thus held it will be positioned first opposite the trimming mechanism and thereafter will be laterally shifted by the turret into the plane of action of the rotary saw, whereby the stem end of the peach is first trimmed and thereafter sawed into two sections and in a plane parallel with the plane of maximum diameter of the pit, the line of severance made by the saw taking place through the plane of maximum diameter of the peach, which may or may not be through the plane of suture of the peach, although it will be parallel with the plane of suture of the peach.

*The flesh and pit dividing means*

Means is provided for splitting, cutting or sawing the flesh of the fruit and also the pit, and this is accomplished in a plane parallel with the plane of maximum diameter of the pit and while the whole fruit is held stationarily in the feed-in turret fingers as hereinbefore described. The fruit and pit dividing means preferably comprises a rotating saw 251, see Fig. 3, which is mounted on a shaft 252 carried in a swinging arm 254 in turn mounted on a shaft 256. This latter shaft is carried in bearings on arms 258 rigidly mounted on the main upright frame of the machine.

Opposed stops, i. e., screws 260, adjustably limit the oscillatory movement of the saw. The saw shaft 252 is rotated by a belt 262, see Fig. 1, through the instrumentality of a double pulley 264 and a pulley 266. A second and larger belt 257 runs on the pulley 264 and thence to a larger pulley 268 which latter is driven by the motor 21 mounted on the top of the main upright frame. This same motor 21 is utilized for driving the main driving pulley and clutch mechanism of the entire machine.

The whole peaches are hand fed between the open fingers 232 and 234 on the feed-in turret. As so fed, each peach is positioned with its crease vertical and its stem end outwardly. The upper and lower fingers 232 and 234, due to their intermeshing connection and their springs, always come to the same closed position with respect to a center line horizontally disposed halfway between the pivotal axis of the fingers 232 and 234. Peaches not being all of the same shape, some being generally round and others being lop-sided, it is necessary to position or feed the peaches between the fingers with the largest diameter of the peach centrally located with respect to the central plane of the fingers, and with the crease or suture line parallel to a vertical plane passing through the fingers. When the fingers are swung to position the whole peach opposite the saw, as shown in Fig. 3, the inner curved wall of the peach will be supported by the finger 230 and the upper and lower curved wall of the peach will be supported by the spaced apart fingers 232 and 234 and on opposite sides of the slots 239, the fingers being spaced apart by these long slots. In this position the rotary saw 251 will advance about its pivot 256 to saw through the flesh of the whole peach as well as through the pit. The line of severance will pass through the peach on a plane parallel with the greatest diameter of the pit and preferably through the greatest diameter of the pit, if such diameter of such particular peach happens to coincide with the fixed plane of oscillation of the rotating saw. In a large percentage of instances, the saw cut will occur to one side of the largest diameter of the pit. The oscillation of the saw is such that it passes into the slot in the upper and lower fingers 232 and 234 as well as through a vertical slot in the bottom of support 230. The saw in its upward movement is arranged to sever the peach into two parts. If desired, the swinging movement of the saw in its forward movement may be arranged to sever all but a relatively small cord of the whole peach. It will be noticed that during this sawing action the peach is supported on each side of the upper and lower peripheries, close to the line of severance, and not at points at right angles to the line of severance. This eliminates the tendency of the saw to bind as it goes through the hard pit.

*The main fruit holding turret*

Means is provided for holding the divided or half fruit sections in a manner so that such sections may be subjected to one or more treatments; specifically, so that the half peach sections carrying the half pits therein uppermost may be held preferably with the longer axes of the pits substantially coinciding with the radius line of the turret that passes through the fruit holder holding such half fruit, whereby the axis of movement of not only the pitting means but also the peeling means will lie approximately parallel to the longer axis of the pit, and whereby the peeling, pitting and discharging of the half fruit from the holding means is facilitated.

In the present instance there is provided a sleeve 139 which turns loosely on the main vertical shaft 136 and extends upwardly above the Geneva disc 140. This disc is fixed to the lower end of sleeve 139. The upper end of sleeve 139 carries a boss 272, see Fig. 3, having an upper disc 274 to which the bottom-most spider of the fruit holding turret 276 is adjustably bolted, the adjustment serving to provide angular adjustment of the fruit holding turret relative to its turning sleeve, whereby to provide an adjustment for insuring that the half fruit receiving and spreading transfer wings or members, hereinafter described, are at the proper closed together position at the time the fruit halves come onto them.

As clearly shown in Fig. 2, the turret disc is provided with a spider providing a mounting for the half fruit receiving means, herein specifically shown as cups. There are six of these cups, each disposed with its center located radially of the shaft 136.

Directly surrounding shaft 136 above turret 276 is located a long sleeve 278, see Figs. 17 and 25. This sleeve forms a mounting for a plurality of devices. It is formed at its upper portion with a preferably integral outstanding projection 280 which faces toward the transfer jaws. As shown clearly in these figures, this projection 280 is formed somewhat generally rectangular. In the side facing the feed-in station it is formed with a substantially central vertical guideway 282 of rectangular cross section. On either side there are provided horizontal bores 284 and 286. Bore 284 receives stationarily one of the rails 288 for the slidable carriage of the transfer jaws. The rail is held fixed therein by means of a set screw. The other bore, 286, receives a bushing 289, see Fig. 25, into which is turnably mounted the other round rail 290, see Fig. 15, forming the carriage slide. Lateral face 292 of the projection 280 is formed with a vertical guideway 294 of rectangular cross section. In addition, the walls of this lateral face 292 are provided with bolt holes to receive bolts 296 for attaching to this face and closing the face of the guideway 294 a vertically extending bracket 298, the top of which overhangs the projection 280 and is formed with a laterally extending arm terminating in a bearing sleeve 300 in which is loosely mounted shaft 174, see Fig. 3. Shaft 174 is driven by shaft 154 of the feed-in turret and has a circular collar 302 pinned thereto, as at 304, which circular collar supports fixedly thereto by means of the same pin 304 the cylinder 178, upon the outer wall of which an endless screw 308 is formed.

The lower portion of long, vertical sleeve 278 is formed with a preferably integral, substantially rectangular, flat portion 310 which extends laterally of the sleeve. This plate is likewise provided with a rectangular raised boss 312 which terminates on each side short of the vertical sides of the flat portion 310 to provide two spaced guides 314 and 316. The front face of the raised boss 312 is formed with a threaded bore 318 into which passes a bolt 320, see Fig. 17, for firmly fixing to the raised boss a bearing block 322, having on its top spaced half bearings 324 and 326 so that the upper inner faces of the half bearings 324 and 326 are spaced from the front face of the flat portion 310 to provide room for intermeshing sectors 328 and 330 fixed on the inner ends of short shafts 332 and 334. These shafts oscillate in the bearings 324 and 326, and their outer ends have fixed thereto short levers 336 and 338, which each have at their upper ends outwardly and oppositely facing bushing sleeves 340 and 342. Bearings 324 and 326 are closed by upper half bearings 344 and 346 formed in a cap 348 fastened to the block 322. This bearing block 322 is formed at its bottom with opposed extensions 350 and 352 having threaded bolt holes. To each extension is bolted a vertically extending cam 354 and 356.

Means is provided for operating the half fruit spreaders from the central rotatable vertical fruit turret shaft 136 and for likewise operating therefrom the fruit transfer jaw mechanism. Above the upper end of the long, vertical sleeve 278 and adjacent the overhanging bracket 300 are positioned two cams 358 and 360, see Fig. 17. These cams directly surround shaft 136 and are pinned thereto for rotation with shaft 136. Each of these cams is formed with an endless cam race of desired shape, in each of which operates a roller 366 and 368. Roller 366 is mounted upon the upper end of a vertically reciprocable rack rod 370 which slides in guideway 294 of the upper bearing 289 on sleeve 278. This rack rod has fixed to its lower end a rack 372, the teeth of which, as shown in Figs. 17 and 25, mesh with the teeth of the sector 328.

The half fruit spreaders

This rack rod 372 slides against face 314 of the bushing 312. The bottom of this rack has bolted thereto a cross bar 374, to the other end of which is bolted a shorter, vertical rack 376 which slides against the face 316 of bearing 312. The teeth of this rack mesh with the teeth on the second sector 330, wherefore upon vertical reciprocation of the racks 372 and 376, the shafts 332 and 334 and their arms 336 and 338 will be oscillated.

Figure 19:
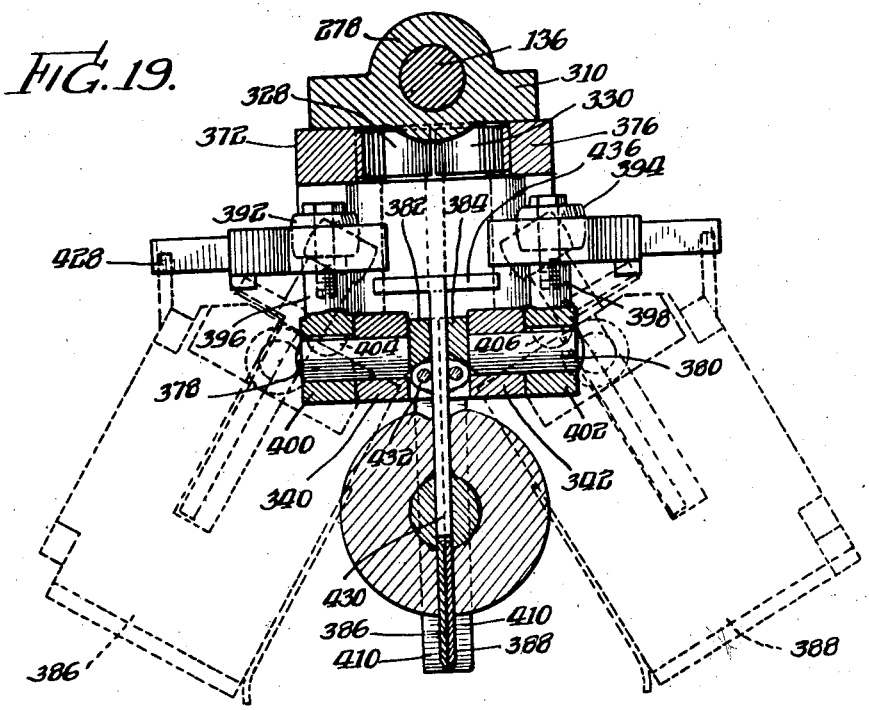
Fig. 19 is a plan sectional view taken on line 19—19 of Fig. 17, showing means for transferring fruit to the peeling cups, and also showing the separating blades in dotted lines indicating the positions they assume when depositing fruit into the fruit cups.

Loosely turnable in each of the bearing sleeves 340 and 342 are short shafts 378 and 380, see Figs. 19 and 24. Each such shaft has integrally, as a part of one end, a small plate 382, 384, see Fig. 24, extending at right angles to the shaft. These plates carry the spreader arms or plates 386, 388, which are relatively thin, flat and preferably rectangular.

Means is provided for oscillating each spreader plate from the vertical position, in which position the plates abut one another, and in which position the fruit halves are received on either side thereof, as shown in Fig. 21, to a position in which the two plates are substantially horizontal and wherein each plate is immediately over a fruit holding cup and approximately three-quarters of an inch, more or less, thereabove. This is the half fruit depositing position, and is accomplished by the racks 372 and 376 and the toothed sectors 328 and 330 heretofore described.

Means is provided for throwing the center line of each spreader plate exactly 30 degrees from the parallel central axis of the two parallel shafts 332 and 334 which oscillate the blades to a position wherein the blades will lie, when horizontal, radially of the fruit turret 276 to correspond with the radial position of the center line 390 of the fruit cups, which line lies on the radius of the central axis of the vertical shaft 136 of the fruit turret, as shown in Fig. 2. This means includes the two spaced cams 354 and 356 cooperating with the rollers 392 and 394 mounted on the ends of short arms 396 and 398, each having a sleeve 400, 402 keyed as at 404, 406, on the two shafts 378 and 380, see Figs. 17 and 24.

This motion of the spreaders demands that the outer ends of the spreaders describe a much greater arc than the innermost ends, in order to overlie the radial cups. This in turn requires means cooperating with the spreaders, and preferably on the spreaders, for positively holding the severed peach halves on the spreaders during this arcuate movement. In the prior Ewald machines disclosed in pending applications, the spreaders are provided with substantially central sharp fins that cut into the central relatively soft core of the half pears or other half fruits and tend to hold the half pears on the spreader during the quick downward flip thereof. In addition, the transfer jaws were positioned relatively close to the half pear on the spreader and moved directly outwardly away from the spreader and half pear as the spreader moved downwardly to deposit the half pear in the cup, whereas in the present peach machine, due to the necessity of the additional arcuate movement imparted to the outer portion of the spreader, the transfer jaws cannot be positioned so close to the spreader to provide the additional support for the peach. Also, due to the presence of the hard pit, no cutting fin or blade can be placed on the spreader to hold the half peach from slipping down on the spreader. Therefore it is necessary to provide a bottom shelf or ledge on the bottom side of the spreader with outwardly flaring outer ends to guide and support the bottom peripheries of the half peaches, and likewise to provide a top holding means with outwardly flaring entry edges to guide and to overlie the upper peripheries of the half peaches as each half peach is transferred onto the spreader. This upper holding means is spring pressed normally to closed position and is moved outwardly by the entering half peach so as to close over the upper edge of the half peach and to hold it on the spreader.

Means is also provided for automatically shifting the holder outwardly in the down position of the spreader to release the half peach into the cup. To this end the bottom outer face of each spreader, see Figs. 21-24, is provided with a narrow ledge 410 having a downwardly flaring front lip 412. The upper outer face of each spreader is provided with a retaining clamp 414 formed by providing the upper outer face with two spaced outstanding lugs 416 and 417 bored to receive a pin 420 which also passes through two spaced lugs 418 on the outer face of the elongated clamp 414. A tension spring 422 is coiled about the pin and arranged normally to resiliently hold the clamp 414 snugly against the upper outer face of each spreader. The front wall of each elongated clamp flares outwardly as at 424 so as to direct the peripheral wall of the half peach beneath the clamp, thereby slightly to open the clamp and to hold the upper edge of the half peach against the spreader plates 386 and 388 while at the same time the ledges 410 will hold the lower edge of each half peach. The rearmost portion of each pivoted clamp is provided with an integral releasing arm 426 which, when the spreader plates reach horizontal discharging position, as shown in dotted lines in Fig. 19, contacts a fixed stop 428 on a stationary part, whereby to open the clamp against the spring tension. In addition, each spreader plate is provided with means for ejecting the half peach from its surface when the spreader reaches horizontal position. This comprises an arm 430 pivoted at 432 within a cut-out 434 in each spreader plate and normally lying within the outer face of the spreader plate. Each such arm is provided with an extension 436 adapted on horizontal positioning of the spreader plate to contact a fixed stop 438 and swing the longer arm 439 of the ejector outwardly forcibly to eject a half peach downwardly into its cup. This ejecting movement takes place substantially simultaneously or in adjustably timed relation with the action of the arm 426 against the stop 428 for releasing the peach from the swinging peach distributing or spreader plates 386, 388.

*The fruit transfer mechanism*

Means is provided in association with the feed-in turret fingers and saw and spreader plates for transferring the severed or partly severed whole fruit from the first feed-in turret, past the saw, and for delivering the divided sections or half peaches onto the spreader plates for subsequent delivery into the fruit cups. To this end two parallel rod rails 288 and 290 are supported at one end in the bores 284 and 286, respectively, of the enlargement 280 on the upper end of the vertical sleeve 278, see Figs. 12-17. The opposite ends of these rails are supported in bearings on a cross brace carried by the frame at the vertical shaft 154 which operates the feed-in turret. Rail 288 is fixed against turning, whereas rail 290 is mounted in its bearing 289 and its opposite bearing for oscillation. Cam 360 through its roller 368 vertically reciprocates a slide 440 carrying a pivotally mounted block 442, which block slides between furcations 446 and 448 on an arm 450 keyed on shaft 290. The opposite end of arm 450 carries an offset arm 452 on which is rigidly mounted an elongated rail 454 extending parallel to the rail rods 288 and 290. Bolted to the upper side and under side of the projection 280 are two guides 456 and 458 which form a vertical slideway for the vertical slide 440. In addition, the lower guide 458 has bolted to its front, as at 460, a bracket 462 for supporting a stationary spreader blade 464 interposed between the rear position of the saw 250 and the oscillatable spreader blades 386 and 388, see Fig. 3. This stationary blade shifts the peach halves laterally out of contact with the saw and onto the oscillatable spreaders.

A transfer jaw carriage is composed of two parallel sleeves 466 and 468 connected at opposite ends by castings 470 and 472. Rotatably mounted on sleeves 466 and 468 by means of concentrically surrounding sleeves 467 and 469 are two depending arms 474 and 476 maintained always at the same distance mutually from the center line 480 by means of intermeshing gear sectors 482 and 484. Projecting from one side of sleeve 469 is a lateral lug 486 carrying a roller 488 which is adapted to lie on the rail 454. Slidable on the rail 454 is a shoe 490 having a pin threaded into its under side and depending therefrom. A coiled spring 492 surrounds this pin between the shoe and a lug 494 which is screwed into the lower part of arm 478, and through which the pin moves freely. The function of this spring connection is to permit the cam mechanisms 360 and 368 and the arm 452 that oscillates the rail 454, to force the rail to its down position even if the arm 478 is pushed outwardly due to an oversized or larger half fruit engaged by the cup on the arm 478. This spring 492 also serves to maintain a proper tension upon the jaws on arms 474 and 478 to transfer the fruit.

The transfer jaw carriage is provided with an adjustable travel over and above the travel given to it by the screw 178. This is done by a lever 496, see Figs. 15 and 16, pivoted to casting 472 by a stud 498. This lever carries a dog 500 which is secured to the lever 496 by a stud 502 and which runs in the endless groove of the screw 178. As the carriage moves to the left through the endless groove and its dog 500, it reaches a point where the lever 496 contacts an adjustable pin 507 dependent from a bearing support casting 506, see Fig. 3. Since this contact stops further movement of the outer end of the lever 496, and since at this point the dog 500 on the lever is still continuing to travel to the left, the outer end of lever 496 will be swung to the left about stop 507 as a fulcrum, and since the transfer jaw carriage is rigid with the pivot 498, the carriage itself moves to the left an additional distance beyond the distance it is caused to travel by its endless screw. In addition, this mechanism provides a longer rest period at the points or times when the jaws are transferring fruit from the feed-in jaws to the transfer jaws and from the latter to the spreaders.

On the return movement of the carriage, the first action is that of dog 500 in shifting the lever 496 about its pivot 498 in a direction to the right until the free end of this lever strikes an oppositely adjustable stop 508, whereupon the continuing movement of the dog to the right compels movement of the carriage to the right through the pivotal connection 498. This additional travel of the carriage on the rails is limited by adjustable stop means 505'.

To accommodate differences in thickness of relatively thicker or thinner halves of fruit on the same peach when grasped by the transfer jaws 474 and 478, one of these jaws is broken and hinged and provided with supplemental springs to make up this difference in thickness. For instance, arms 474 and 478 come together in unison to a common distance from the central plane 480, Fig. 12. Arm 474 is provided intermediate its height, as at 510, with a pivotal connection to a lower portion 512. Arm 512 below pivot 510 has an outstanding lug 514 between which and another lug 516 on the upper part of arm 474 a coiled spring is confined at each end. In operation this provides the necessary resilience to take up the variation in thicknesses. If desired, both arms may be provided with this type of resilient adjustment.

To provide against turning the peach as it is dragged over the surfaces of the saw, after splitting, there is provided on the inner surface of the transfer cups 481 sharp, knife-like fins 518, 520, which lie in a vertical plane to prevent the peach halves turning in the transfer cups about horizontal axes. This means preserves the positions of the halves of the peaches during the transfer from the sawing station to the pitting station.

The half fruit holding means

Except for the size and round shape of the cups to accommodate peaches in lieu of pears as illustrated in the prior filed applications of Mark Ewald and except for the absence of grooves and except for a greater shallowness in the depth of these cups, their construction and operation is identical to the cup structures disclosed in said prior mentioned Ewald applications.

Figure 6:
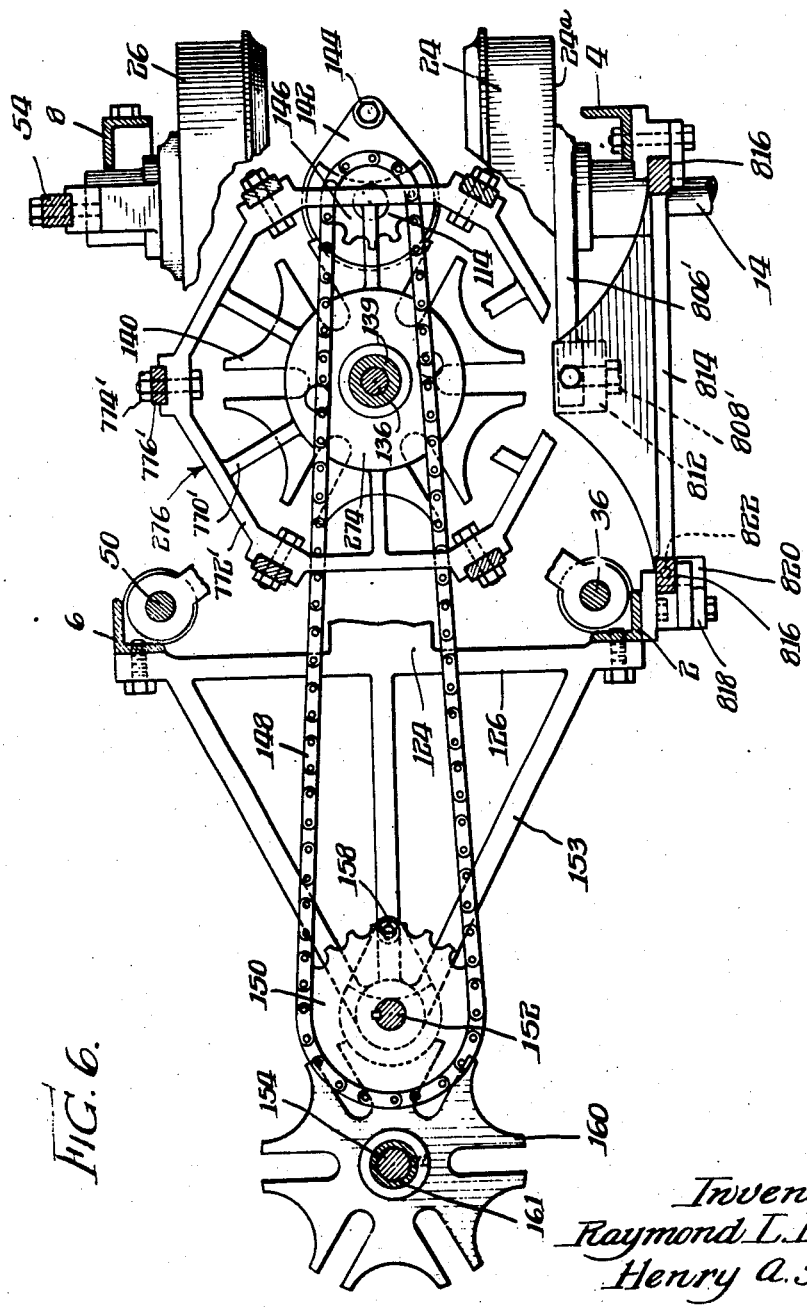
Fig. 6 is a plan sectional view taken on line 6—6 of Fig. 3, showing part of the driving mechanism.

Referring to Fig. 6, the turret disc 276 is provided with a plurality of radially extending spokes 770' uniting with a rim or web 772' forming an intermittently rotating spider. At equally spaced angular intervals about this spider the web is formed with a vertical countersink suitably bored and threaded to receive a bolt 774'. The shank 776' of a half fruit holding means is thus removably mounted in each one of these countersinks on the web. In the present instance six half fruit holding means are so mounted. Each half fruit holding means preferably comprises a cup formed of two relatively hinged halves. One of the halves is stationary and is formed with the depending rigid shank 776' heretofore described as bolted to the turret web whereby to carry each complete cup intermittently to and past each operating station. The other half 780' of each cup is formed with rigid furcations 782' and 784', Fig. 29. These furcations and the shank 776' of cup half 778' are provided with registering bores to receive a pivot pin 786', thereby pivotally holding the cup halves together in closed position or permitting the cup half 780' to swing outwardly from the fixed cup half 778'.

In order to cause an opening movement of the cup half 780', it is provided with a rigid depending arm 788' formed with a lateral offset 790' carrying a roller 792' which is adapted to be contacted by a lug 794' on the bottom of an arm 796' on the peeler head, soon to be described.

The peeling station

Except for certain modifications forming the subject matter of the disclosure and claims of this present application, the construction and operation of the peeling action is precisely the same as that of the machine disclosed and claimed in certain pending applications filed by Mark Ewald, and particularly in application Serial No. 78,508, filed May 7, 1936, jointly filed by Mark Ewald and Henry Skog.

The important differences in the peeling mechanism and its cooperation with the fruit cups reside in the fact that in the operation of pitting the peaches, particularly the clingstone variety, the cups are more shallow than existing half pear holding cups, because it is important to have the gauge or presser plate 662 that determines the depth of penetration of the pitter blade points 787 into the cut face of the half fruit at the subsequent pitting station contact the cut face of the half peach and not the upper rim of the peach cup. By this means there is effected the positive positioning of the cutting edges of the pitting blades a predetermined distance into the cut face of the half fruit to initiate the pit locating action as hereinbefore described. It is not desirable to utilize an apertured paddle in pitting a peach as in coring a pear, because of the necessity of providing an aperture sufficiently large in diameter with relation to the different loci of the half pit in variant shapes of successive peaches operated upon as they pass through the machine. In short, in the average run of peaches the half pits will be eccentrically located with respect to the curved outer walls of the whole or half peach, which will require a larger range of locating or lateral travel of the pitter blades, which in turn demands a larger opening in the presser plate. If the presser plate were to be confined wholly within the inner wall confines of the half peach holding cup, the area of the cross section of the presser plate remaining would be too small and would tend to cut into the cut face of the half fruit, injuring its appearance. Therefore, in the case of pitting peaches the relatively large and wider presser plate is utilized—a presser plate which projects beyond the rim of the cup and this demands that the walls of the cup be cut down or be shallower.

At the peeling station it is important that the cup wall or that half of the cup which supports the half peach from or through which the peeling knife emerges be sufficiently high to support the entire curved wall of the half peach. Experience has shown that as the peeling knife comes up on its emerging travel through the flesh of the half fruit, if the outer wall at the peel is not supported, the presser foot which contacts the center portion of the half fruit will cause the outer peel carrying wall to project slightly over the cup rim so that as the peeling knife emerges it will form a diagonal cut in the flesh of the fruit at the juncture of the cut face of the half fruit and the peel. This is unsightly and ruins the appearance and salability of the half fruit. Hence in the present invention, in connection with the peeling mechanism and cup there is provided means for supplementally supporting that outer wall of the half peach or half fruit located at the arc of emergence of the peeling knife at the cut face of the half fruit.

Referring now to the details of construction of the peeling mechanism, and beginning with an inspection of Figs. 26, 29 and 30, of the drawings, shaft 14 is provided with cam yoke 800' formed with a roller 802' operating in cam race 804' on one face of the double faced cam 24. This cam yoke 800' is provided with a lateral arm 806' having a pin 808' adjustable in a vertical slot 810 formed in a depending ear 812 of a vertically reciprocable peeling slide 814 adapted to slide in guideways 816 of the main upstanding frame. In addition, the upright on which one of the guides 816 is attached is also provided with a bracket 818 having a lateral toe 820 threaded to receive an adjusting screw 822 adapted to contact the bottom of the slide 814 to adjustably limit its downward position, which in turn determines the thickness of the peel taken from the peach at the bottom of the cup. The adjustment 810 is for the same purpose, since it adjustably determines the throw of the slide 814. The screw stop 822 is provided to fixedly determine this adjustment in case the cam race 804 or roller 802 wear.

On the upper end of slide 814 is provided a horizontally disposed platform 824 bolted as at 826 to the top of slide 814. Platform 824 has bolted to its top, as at 828, a bearing 830 for shaft 832. This shaft has keyed thereto a short lever 834 connected at 836 to a universal 838 attached to a rod 840 connected to an arm in turn actuated by vertical shaft 36, see Fig. 2. The shaft 832 integrally has a toothed sector 842 oscillatably depending therefrom for actuating a pinion 844 on a shaft 846 in a bearing formed in depending arms 848 carried by the plate 824. These arms are spaced apart to receive therebetween this pinion 844. In like manner, the opposite side of the plate or platform 824 is provided with depending arms 850 and 852 forming spaced bearings to receive a shaft 854 on which is pinned a pinion gear 856 in turn actuated by a second sector 858 on the end of a depending arm 860 pinned to shaft 832; the end of this shaft has a second bearing 862 on the platform 824. In other words, shaft 832 on its opposite ends has sectors for driving pinion gears 844 and 856 on shafts 846 and 854 which actuate the peeling knife. This peeling knife is thus driven from both ends.

The inner ends of the two spaced short shafts 846 and 854 each have a rotatable block 858, 860, to each one of which is fixed a substantially triangularly shaped block 862, 864 with a groove and screw 866 and 868 for fixing thereto the end of the peeling knife 870. Thus the peeling knife is oscillated from each end. On each shaft 854 and 846, adjacent each block 858 and 860 is a round collar 872 and 874, loosely surrounding the shaft. The collar 874 has an integral curved arm 876 carrying a cross bar 880 which laterally interconnects with the arm 878 on the collar 872, and these two arms are generally horizontally arranged at one side of shafts 846 and 854, see Figs. 67 and 70. The cross bar 880 has extending from its edge a lug 881 which contacts a stud 883 which is attached or screwed into the peeling head 850, and thereby prevents the downward swing of the peeling cup extension 890 when the peeling head 824 rises, but will allow a sufficient movement upward to allow the peeling cup to close. This cross bar has two threaded openings 882 to receive threaded bolts 886 for fastening to the under side of the cross bar a detachable plate 888, the inner wall of which is arcuately formed, as at 890, and shaped to form a vertical extension of the cup rim 892 of the movable sector 780, see Fig. 31. By mounting the collars 874 and 876 loosely on the shafts 846 and 854, the plate 888 may rise and fall as the loose half 780 of the cup moves in under the action of its cam.

Keyed on shaft 846 adjacent to an arm 874 is a cam 882 which cooperates with a roller 891 on an arm 893 pivoted at 894 and having a depending arm 896 carrying screws 898 which pass through a slot 900 into threaded engagement with the arm 796. Another extension of the arm 893 which pivots at 894 is provided with a toothed extension 902, to which is connected spring 904. Teeth 902 provide an adjustment for soft or hard fruit. The farther out the greater the spring tension and the more the pressure of the cup segment upon the fruit in the cup. When fruit is hard it is harder to push over against the stationary section of the cup. Hence this adjustment 902. When the roller 891 is in the low part of cam 832, the arm 796 acts on roller 792 to close the cup sections. The spring 904 resiliently and yieldably holds the cup sections in closed position, and the cups may therefore accommodate fruit halves of various sizes. When the roller 891 is on the high side of cam 882, the finger 796 is moved away from roller 792, thereby releasing the movable section of the cup to allow it to open to normal size such that its inner walls are concentric to the axis of the shaft 854 and the axis of rotation of the peeling knife.

The upstanding platform 824 is provided with a substantially centrally disposed vertical bore to receive the presser foot mechanism, including the vertically operating pressure foot 910 which is adapted to keep the half fruit from turning in the cup during peeling and also to keep the half fruit down in the cup during peeling. The details of construction and operation of this presser foot mechanism are disclosed and claimed in the prior pending application of Mark Ewald and Henry Skog, filed May 7, 1936, Serial No. 78,508, which has matured into Patent No. 2,242,243, granted May 20, 1941, and therefore no further detailed disclosure is given here other than to say that when the peeling head descends to position the peeling blade relatively to the then stationary cup containing a half fruit with its cut face uppermost, the peeling pad mechanism is likewise brought down and is positioned so that the peeling pad 910 contacts resiliently and adjustably with the cut face of the half fruit and is locked by the rack mechanism 912 in such abutting position. During this contacting action the ejector pad 914 is resiliently forced upwardly into the countersink of the peeling pad until such time as the peeling head rises, carrying the peeling pad 910 with it. Since the inner spring 916 is urging the ejector foot downwardly, the ejector foot 914 will be held in contact with the cut face of the half fruit, whereas the entire peeling pad 910 will have risen out of contact with the cut face of the half fruit. This action will break the suction or adhesion between the face of the peeling pad and the wet, sticky, smooth surface of the half fruit. As soon as the peeling head 824 ascends sufficiently, it will likewise carry the ejector foot 914 out of contact with the half fruit. The adjustment 918 is to vary the tension of the peeling pad on the half fruit to accommodate the tension pressing down on relatively hard or relatively softer fruit so as to prevent injury thereto while maintaining the required pressure. The double rack teeth 912 provide a fine setting for the single pawl or tooth 920 which as the presser foot descends into contact with different sizes of successive half fruit, rides freely over the successive ratchet teeth and takes a desired setting of several vertical settings with respect to the series of teeth on the ratchet mechanism. This is due to the spring 924 constantly urging the racks 912 toward the tooth 920. As the peeling knife descends into the half fruit, the tooth 920 is incapable of rising against the rack teeth and therefore the presser foot is firmly held in its adjusted position until released by the cam roller 922 actuated by cam 924 on the shaft 832 to urge the ratchets 912 laterally out of contact with the pawl or tooth 920, thereby releasing the peeling pad and whereby to now permit the free ascent of the peeling pad with the ascent of the peeling head.

By reference to Figs. 2 and 29, it will be noted that when the half fruit is positioned under the peeler head, the axis of turning of the peeler mechanism will be substantially parallel to the longitudinal axis of the pit, whereby to facilitate the peeling operation.

*Operation*

In the operation of the machine, from the motor 21, when the clutch control handle, shown in Fig. 1, is properly thrown to actuate the main driving shaft from the motor 21, the various shafts, including the two horizontal shafts 14 and 16 and the various reciprocable slides shown in Figs. 27 and 28, are put in operation, whereby not only to advance the feed-in turret 162 step by step but also through the instrumentalities of the driving means shown in Fig. 6 of the drawings to actuate the main turret 276 carrying the cups intermittently in synchronism with the feed-in turret and at a speed twice as fast as that of the feed-in turret. In addition thereto, the endless screw 178 for actuating the transfer jaws will likewise be actuated to carry these jaws back and forth between the feed-in turret and the stationary blade 464 adjacent the oscillatable spreader blades. In addition, through the cam 156 the rotating saw will be oscillated between the feed fingers 232 and 234 of the feed-in turret and the stationary plate 464 as shown in Fig. 3. Likewise, through the instrumentalities of the various slides hereinbefore described, including the slide 814, see Fig. 1, as hereinbefore described, the slide 814 in its up and down reciprocation carries not only the peeling platform and pitting platform but also carries the whole fruit extracting and discharge mechanism, so that as the slide 814 moves upwardly the pitting, peeling and discharging mechanism will move upwardly away from the fruit cups, whereby to permit the main turret intermittently to move and present a fresh pair of cups to the oscillatable spreader plates while at the same time carrying a cup with a half fruit disposed therein with its cut face uppermost in correct position beneath the peeling head, and simultaneously therewith to convey a cup carrying a half peach, which has been properly peeled, to the pitting station for the pitting operation, and at the same time carrying the cup which has heretofore been at the pitting station to the fruit discharging station; and in addition shifting the cup which has been at the fruit discharging station and from which the fruit has been discharged, leaving the peel and half pit therein, to the scavenging station. In addition, that cup which has been scavenged at the scavenging station in the prior cycle of operations will thence be moved to the fruit depositing station. Inasmuch as the main fruit cup holding turret will move twice as fast as the main feed-in turret moves, there will always be two empty cups at the half fruit receiving station to receive the half fruits from the spreader jaws.

Referring now to the details of operations, the operator standing at the end of the machine as shown in Figs. 1 and 3, as the jaws 232 and 234 of the intermittently operated feed-in turret come opposite to such operator, the jaws are in open position. A whole peach is inserted in position with its butt end abutting the stationary jaw 230 and with the stem cavity end facing outwardly. The maximum diameter of the fruit is centered in the central plane of the jaws 232 and 234. Prior to the next intermittent movement of the feed-in turret, the jaws 232 and 234 will be permitted to close by the action of the cam means 246 acting on rollers 250, plus the action of the springs 237, so that before the feed-in turret moves, these fingers will have closed upon the peach, each finger moving a predetermined amount, which is equal exactly to the predetermined movement of the other finger. In other words, these two fingers 232 and 234 always center the peach with respect to a horizontal plane, uniformly at the same horizontal elevation.

In the next intermittent movement of the feed-in turret, the fingers 232 and 234 carrying the whole peach are moved to the peach stem cavity slitting station and stopped thereat so that through the instrumentalities of the mechanism shown in Fig. 9, the nose 197 will find the peach cavity and will hold the peach cavity firmly and gauge the depth which the blades will cut, while the spaced slitting blades 204 will move upwardly on either side of the nose 197 to slit the side walls of the peach at the stem cavity, forming two substantially vertical, substantially elliptical slits therethrough. Subsequent to this operation, the feed-in turret will again move intermittently to convey the whole peach to the position shown in Fig. 3. At this time the rotating saw 250 will be oscillating toward the left so that the saw will thence cut through the peach stationarily held between the two stationary fingers 232 and 234. The saw, in cutting through the peach, will pass through the slots in these fingers and also through a slot in the stationary finger 230. These fingers 232, 234 and 230 are preferably arranged to permit a complete severance of the whole peach into two halves, while stationarily held between the fingers 232 and 234. However, in some instances it is desirable to have the saw 250 swing inwardly, cutting through the half peaches to such extent as completely to sever the pit and to sever entirely all the flesh of the fruit except a small segment thereof, as shown by the dotted lines in Fig. 3, in which case the unsevered portion will serve to hold the peach sections together until grasped by the transfer jaws to avoid possible dropping out of the feed jaws. This also permits the utilization of a relatively smaller saw. During this cutting of the peach, the feed jaws press in on the peach only from the top and bottom and adjacent a line passing centrally approximately through the pit, thereby tending to spread and thereby eliminating any pressing action of the sides of the peach against the saw blade and whereby to provide a cleaner cut and preventing pit dust from embedding in the peach. In addition, this same operation gives the pit dust opportunity to pass out of the peach and not become embedded in the flesh.

Upon the completion of the severing operation, and through the instrumentality of the endless screw 178, the transfer jaws have now arrived opposite the severed peach held between the fingers 232 and 234, except that the transfer jaws are in open position. At this time the transfer jaws are moved laterally inwardly due to the mechanism illustrated in Figs. 12 and 13, whereby resiliently to grasp the peach from opposed lateral sides and intermediate the zones from which the peach is held by the fingers 232 and 234. Due to the resilient mounting of these transfer jaws as shown in Fig. 12 and as hereinbefore described, the variations in half peach sections are resiliently taken up by the transfer jaws, it being noted however that due to the intermeshing of the gearing as shown in Fig. 12, each transfer jaw will be bodily moved the same distance, yet due to the resilient mounting of the lower portions of the jaws, such portions can resiliently move to accommodate thicker or thinner half peach sections.

Slightly after the grasping of the peach by the transfer jaws, the fingers 232 and 234 are now positively opened and the transfer carriage is then carried forward away from fingers 232 and 234 before the feed-in turret starts to turn intermittently, and the transfer jaws are then carried in a straight line motion, as shown in Fig. 3, carrying the half peach sections across the saw 250. It is desirable to give the transfer jaw a greater speed of movement than the speed of oscillation of the rotating saw to the right, so that if there be any uncut portion of the flesh of the peach which has not been completely severed by the saw when the peach is stationarily held between the jaws 232 and 234, this remaining portion will be severed by being conveyed past the toothed cutting edge of the saw.

Figure 20:
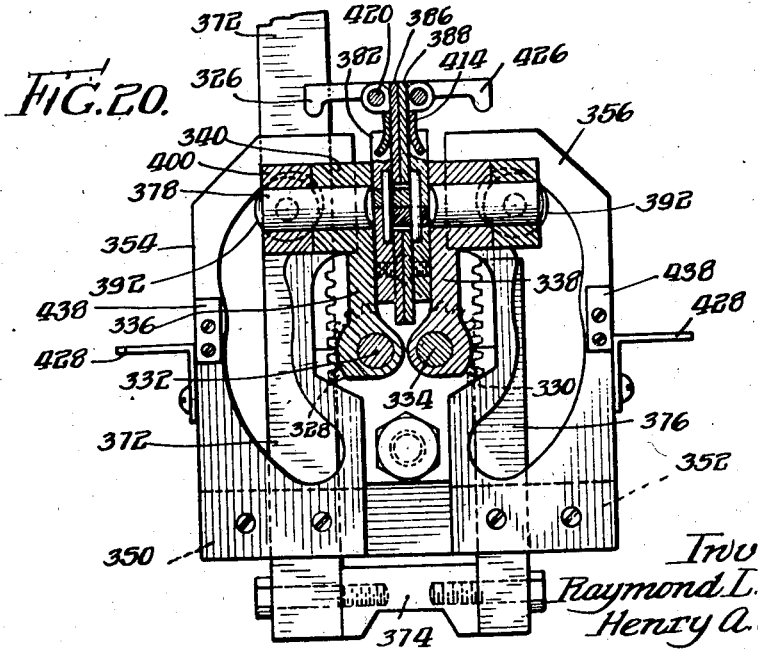
Fig. 20 is a vertical section taken on line 20—20 of Fig. 17.

The two half peaches in the transfer jaws 481 are now conveyed to the right, as seen in Fig. 3, directly onto the stationary spreader plate 464 which is directly in the plane of the saw 250 and the entering edge of which is substantially of the same width as the saw. The spreader plate, if desired, is slightly thicker at its rear than at its front, so as to slightly spread the half sections on the stationary spreader plate 464 and as they are held between the jaws. The transfer jaws 481, continuing to move, next carry the half sections directly onto the oscillatable spreader plates which in this stage of the operation are in vertical juxtaposition, as shown in Figs. 20 and 21, see particularly Fig. 21. In this movement the lower edge of the peach will contact the downwardly flared lip of the lower ledge of each spreader plate, while the upper periphery of each half peach will ride under the outwardly flaring lip 424 of each spreader plate, whereby resiliently to raise each clamping plate 414 of the spreader plate to permit the peach to be held on each vertical spreader plate between the lip 410 and this resilient clamping plate 414. This is shown in Fig. 21. At this time, through the action of the mechanism shown in Figs. 19-24, inclusive, the transfer jaws will move quickly outwardly at right angles to their direct line of travel, and after the jaws have so moved out, the spreader plates 386 and 388 will be shifted from a vertical position, shown in Fig. 21, to a horizontal position, shown in Fig. 19, it being noted that the outer ends of each spreader plate will move through a greater arc than the inner ends thereof. This is for the purpose of properly depositing one half peach into the radially aligned cups. In explanation, by reference to Fig. 2 it will be noticed that each cup has its central axis 390 radially of the vertical axis 136 of rotation of the main cup carrying turret, so that in order to prevent turning of a peach angularly from the parallel, straight line motion while carried in the transfer carriage, and while the half peaches are deposited onto the spreader plates and transferred thence to the cups, it is necessary to move the spreader jaws so that the peach pits will occupy the correct position in the peach cups when the cups carrying the half peaches with the pits are moved to the peeling and pitting stations. At the spreader plates are moved to downward horizontal position, through the action of the sector 328 intermeshing with the rack 372 and sector 330 intermeshing with the rack 376, and as the outer ends are moved arcuately through the action of the silent cams and rollers 392 and 394 running in the cam slots of the cam blocks 354 and 356, the trigger 426 of the releasing clamp will be opened by striking the angle plates 428 against the tension of the spring 422 to release the upper edges of the clamped peaches and at the same time the kicker discharge mechanism 430 will be actuated to positively kick the half fruit into the registering cups which are now immediately below the horizontally disposed presser plate by striking on the stop 438. It will be noted that during the transfer of the fruit sections by the transfer jaws, each fruit section is held in a predetermined plane by means of the relatively small pointed blades 518 and 520, see Fig. 12.

The action of the kick-off mechanism and of the trigger is accomplished by the stationary stops 428 and 438 as hereinbefore described.

Upon the depositing of each half fruit section in its cup, this being done simultaneously for the two half sections, the main feed turret carrying the cups will move in a counter-clockwise direction, as seen in Fig. 2, carrying one of said cups having a half fruit therein with its cut face uppermost and with the pit unsevered from the flesh thereof to the peeling station as shown in Fig. 2. Simultaneously the spreader plates will be swung back to vertical position to receive a subsequent severed whole peach.

Upon the arrival of the half fruit at the peeling station, in synchronized sequence the peeling head will descend through the operation of the slide 814. By reference to Fig. 29, upon the descent of this peeling head the half peach will be held in the cup, the two cup sections being in closed position at this time. The presser foot 910 will be resiliently brought down upon the cut face of the half fruit, the ejector foot 914 moving resiliently upwardly into the chambered presser foot. The reversed locking mechanism will then lock the presser foot in this adjusted position and in proper timed sequence the peeling knife, as shown in Fig. 31, will swing downwardly through the cup between the inner wall of the cup and the margin of the presser foot 910, whereby to start the peeling of the peach. As the peeling knife reaches the bottom of the righthand sector 789', and through the action of the arm 788 on the shiftable cup section, the latter will be thrown open. The edge of the peeling knife is constructed in accordance with the disclosure in the Mark Ewald Patent, No. 2,123,187, granted July 12, 1938. The blunt edge on the outer face of the peeling knife is formed at such an angle as to cause the knife not only to peel the fruit but likewise to force the half peach bodily toward the right, as seen in Fig. 31, whereby to cause the outer wall of the peach snugly to fit against the inner wall of the movable section 780'. In explanation, during the downward movement of the knife the two body sections have been forced together whereby firmly to force the half peach against the inner wall of the stationary section of the cup so as to cause the peeling knife always to pass through the peach at a uniform distance from the inner wall of the half fruit. Then as the knife reaches the bottom zone of the stationary section of the cup, the movable section of the cup will then open to a position such that its inner wall is exactly concentric with the center axis of the cup, and at this time the outer blunt face or inclined face of the peeling knife is formed at the proper angle, as disclosed in the aforementioned application, so as to force the half peach bodily over and firmly against the inner wall of the now shifted cup section so that the inner wall will present a true concentric continuation of the inner stationary wall of the cup, so that the peeling knife in its continued movement will swing upwardly through the peach, always at a uniform distance so as always to take the uniform thickness of peeling from the peach.

Due to the fact that in the subsequent pitting operation it is necessary to have a more shallow cup in order to permit the presser plate to flatly contact the cut face of the half peach as it comes down, and since the sections of half peaches are of variant size, it is necessary to have a shallow cup so that the presser plate will not contact the rim of the cup. In order to prevent the peeling knife, as it swings upwardly through the section 780' of the cup, from breaking off the flesh at the margin of the cup, it is necessary to reinforce the outer periphery of that portion of the peach which extends above the cup wall at this point. Therefore, it will be noted that the reinforcing lip or rim 880, which is carried upon the peeling head, when the peeling head descends to peeling position will exactly coincide with the outwardly moved position of the cup section 780' and will form a continuation thereof, and that the peeling knife in swinging upwardly will act against this continuation, which reinforces the peach at this point.

Upon the completion of the peeling operation the peeling head will move upwardly in timed relation; the presser foot, being carried by the peeling head, will move upwardly, leaving the discharge foot 914 in contact with the sticky surface of the severed pit, thereby breaking any vacuum or adhesion between the presser foot 910 and the sticky surface of the half peach. As the peeling head continues to move upwardly, the presser foot is the last to be removed from the half peach. Upon the upward movement of the peeling head, the mechanism is unlocked for subsequent movement. When the peeling head has cleared the cups in the turret on its ascent, the turret is then given an intermittent motion in a counter-clockwise direction to carry the cup containing the peeled half fruit to the pitting station, as shown clearly in Fig. 2. At this station, the peeled half peach, lying on its severed peeling and lying in the cup, is brought under the pitting head and the releasing arm 783' has been removed from contact with the trigger 794' so that the sections of the cup grasp the half peach with its pit uppermost.

The pitting mechanism per se forms the subject matter claimed in Patent No. 2,216,165, granted October 1, 1940.

The invention is hereby claimed as follows:

1. The method of completely peeling a whole peach which comprises peeling the stem cavity of the whole peach, and cutting the whole peach, including the pit, through a plane parallel to and adjacent the plane of maximum cross-sectional area of the pit, and peeling each half peach by an arcuate line of severance curving about an axis passing through and parallel to the longitudinal stem axis of the half pit, said line of severance merging at the stem cavity with the peeled area of the peach from which the peel was previously cut at such stem cavity.

2. The method of peeling a whole peach comprising forming elliptically-shaped lines of severance through the stem cavity of the peach, the major axis of the elliptical-shaped lines of severance being parallel to a plane parallel to and adjacent the plane of maximum cross-sectional area of the pit, whereby to sever the peel at the stem cavity, severing the whole peach and pit through substantially the plane of maximum cross-sectional area of the pit, peeling each half peach by a single line of cut arcuately formed about an axis parallel to and passing through the longitudinal stem axis of the pit, the line of cut conforming to the curvature of the curved wall of the peach, and said line of cut arcuately cutting through the flesh of the peach just beneath the peel beginning and terminating at the cut face of the half peach on opposite sides of the pit whereby the second line of severance merges with the line of severance formed in the stem cavity whereby completely to remove all of the peel of the peach.

3. In a device for peeling a half fruit, the combination of means forming a substantially concave fruit holder adapted to receive and hold a half fruit by contact with the curved outer wall of the half fruit, peeling means adapted to cut arcuately through the flesh of the half fruit immediately within the peel and to move in a continuous manner from the cut face of the half fruit at one side of the central seed containing section arcuately into the body of the fruit, thence arcuately outwardly through theh body of the fruit, and emerging from the body of the fruit at the opposite cut face of the half fruit, means separate from the fruit holder for reinforcing that rim or edge of the inner wall of the fruit holder at the cut face of the half fruit and from which the peeling means emerges, and means for relatively shifting said reinforcing means and the fruit holder to cause the reinforcing means to be positioned at the aforementioned rim or to cause it to be displaced from the aforementioned rim.

4. In a device for peeling a half fruit, the combination of means forming a shiftable support carrying a fruit holder adapted to receive and hold a half fruit by contact with the curved surface of the half fruit exposed, peeling means adapted to cut through the flesh of the half fruit immediately within the peel while the half fruit is supported in the holding means, said peeling means including a movement of emergence from the flesh of the fruit at the cut face of the half fruit, a peeling head carrying said peeling means and shiftable relatively toward and from the fruit holder, an auxiliary fruit supporting means including a portion arcuately curved and adapted substantially to register with the inner fruit supporting portion of the main fruit holder during the peeling operation for supporting the peeling at that cut face of the half fruit from which the peeling means emerges, and means producing relative displacement movement between the fruit holder and the additional reinforcing means subsequent to the peeling operation.

5. In a device of the class described, the combination of a turret having a plurality of spaced apart fruit holding cups for receiving and holding a half fruit therein, means for intermittently moving the turret, a peeling head adapted to reciprocate toward and from the turret and to be positioned immediately over a cup when the turret is at rest, a peeling knife on said head and adapted to swing arcuately through the cup when positioned in registration with the cup to form a continuous line of severance through the flesh of the half fruit beginning and ending at the cut face of the half fruit immediately within the peel, and a rim reinforcing means mounted on the peeling head and adapted to be positioned during the peeling action so that an arcuate portion of the rim reinforcing means registers with that inner wall of the cup from which the peeling knife emerges during the peeling action.

6. In a device of the class described, the combination of a turret having a plurality of spaced apart fruit holding cups for receiving and holding a half fruit therein, means for intermittently moving the turret, a peeling head adapted to reciprocate toward and from the turret and to be positioned immediately over a cup when the turret is at rest, a peeling knife on said head and adapted to swing arcuately through the cup when positioned in registration with the cup to form a continuous line of severance through the flesh of the half fruit beginning and ending at the cut face of the half fruit immediately within the peel, and a rim reinforcing means mounted on the peeling head and adapted to be positioned during the peeling action so that an arcuate portion of the rim reinforcing means registers with that inner wall of the cup from which the peeling knife emerges during the peeling action, said mounting of the reinforcing means on the peeling head including means permitting said reinforcing means to swing toward and from the cup.

7. In a device of the class described, the combination of a turret having a plurality of spaced apart fruit holding cups for receiving and holding a half fruit therein, means for intermittently moving the turret, a peeling head adapted to reciprocate toward and from the turret and to be positioned immediately over a cup when the turret is at rest, a peeling knife on said head and adapted to swing arcuately through the cup when positioned in registration with the cup to form a continuous line of severance through the flesh of the half fruit beginning and ending at the cut face of the half fruit immediately within the peel, and a rim reinforcing means mounted on the peeling head and adapted to be positioned during the peeling action so that an arcuate portion of the rim reinforcing means registers with that inner wall of the cup from which the peeling knife emerges during the peeling action, said rim reinforcing means being pivotally mounted on the peeling head to permit the rim reinforcing means to rise and fall relatively to the cup.

8. In combination, an intermittently rotating turret having a plurality of spaced apart cups mounted thereon, each cup including relatively shiftable sections adapted relatively to move outwardly away from each other during at least a portion of a peeling action, a peeling head shiftable relatively toward and from the turret and adapted to be positioned in registration with the cup for a peeling action, said head having a peeling knife thereon, means for swinging the peeling knife through the cup immediately beneath the peeling in an arcuate movement beginning and ending at the cut face of the half fruit, means whereby during the relative movement of said cup sections the inner opposed walls of the cup assume an exact concentric conformation during the swinging movement of the peeling means in a direction outwardly through the cup, and rim reinforcing means including an arcuate portion shaped to conform to an inner arcuate wall portion of the cup, said rim reinforcing means being shiftably mounted upon the peeling head and adapted automatically to shift while in contact with one of said relatively shiftable cup sections to permit said cup section to shift relatively during said portion of the peeling operation.

9. In combination, an intermittently rotating turret having a plurality of spaced apart cups mounted thereon, each cup including a stationary section and a pivotally mounted section adapted to move outwardly away from the stationary portion of the cup during at least a portion of a peeling action, a peeling head shiftable relatively toward and from the turret and adapted to be positioned in registration with the cup for a peeling action, a pair of coaxial shafts on said peeling head, a peeling knife operatively connected to each of said shafts and positioned to swing through the cup to form a peeling cut beginning and ending at the cut face of the half fruit, a bracket member having a pair of bearings, each pivotally mounted on one of the shafts to which the peeling knife is connected whereby said bracket is pivotally mounted on said shaft, and an arcuate semi-circular rim mounted on the under side of said bracket and adapted to be positioned in the outward position of the shiftable cup section substantially flush with the inner wall of said cup to provide a reinforcement for said cup during that portion of the peeling action in which the knife swings outwardly through said section of the cup.

10. In combination, an intermittently rotating turret having a plurality of spaced apart cups mounted thereon, each cup including a stationary section and a pivotally mounted section adapted to move outwardly away from the stationary portion of the cup during at least a portion of a peeling action, a peeling head shiftable relatively toward and from the turret and adapted to be positioned in registration with the cup for a peeling action, a pair of coaxial shafts on said peeling head, a peeling knife operatively connected to each of said shafts and positioned to swing through the cup to form a peeling cut beginning and ending at the cut face of the half fruit, a bracket member having a pair of bearings, each pivotally mounted on one of the shafts to which the peeling knife is connected whereby said bracket is pivotally mounted on said shaft, an arcuate semi-circular rim mounted on said bracket and adapted to be positioned in the outward position of the shiftable cup section substantially flush with the inner wall of said cup to provide a reinforcement for said cup during that portion of the peeling action in which the knife swings outwardly through said section of the cup, said reinforcing section being adjustable and detachable for variant sizes of cup, and means for permitting said reinforcing means to rise and fall vertically due to the lateral movement of said shiftable cup section while preventing said reinforcement from falling below a predetermined level.

11. In combination, an intermittently rotating turret having a plurality of spaced cups mounted thereon, each cup including relatively movable sections adapted to shift relatively from a position in which their inner walls are eccentric to a position in which their inner walls are concentric, a peeling head shiftable relatively toward and from a cup and adapted to be registered relatively to a cup for peeling action, a peeling knife on said head, means for arcuately swinging said knife through said cup to peel the half fruit contained therein, means causing the relatively shiftable cup sections to assume their aforesaid positions, and means carried by the peeling head and shiftable thereon and relatively to the cup for providing an extension for the rim of one of said cup sections during a portion of the peeling action.

12. In combination, an intermittently rotating turret having a plurality of spaced cups mounted thereon, each cup including relatively movable sections adapted to shift relatively from a position in which their inner walls are eccentric to a position in which their inner walls are concentric, a peeling head shiftable relatively toward and from a cup and adapted to be registered relatively to a cup for peeling action, a peeling knife on said head, means for arcuately swinging said knife through said cup to peel the half fruit contained therein, means causing the relatively shiftable cup sections to assume their aforesaid positions, and means shiftable relatively to the cup for providing an extension for the rim of one of said cup sections during a portion of the peeling action, said cup extension shifting to permit the relative movement of said cup sections.

13. In combination, an intermittently rotating turret having a plurality of spaced cups mounted thereon, each cup including relatively movable sections adapted to shift relatively from a position in which their inner walls are eccentric to a position in which their inner walls are concentric, a peeling head shiftable relatively toward and from a cup and adapted to be registered relatively to a cup for peeling action, a peeling knife on said head, means for arcuately swinging said knife through said cup to peel the half fruit contained therein, means causing the relatively shiftable cup sections to assume their aforesaid positions, and means shiftable relatively to the cup for providing an extension for the rim of one of said cup sections during a portion of the peeling action, said cup section extension shifting to permit the eccentric relative positioning of said cup sections.

14. In a fruit peeler, the combination of a support, a sectional cup thereon, means for moving the sections of said cup relatively whereby to cause their inner walls to lie eccentrically or concentrically relatively and while holding a half fruit therein, peeling means including a knife adapted to swing through the cup sections to peel the fruit, rim extension means for one of said cup sections, and means for shiftably mounting said extension means to cause the extension to shift relatively to said cup during relative shifting movement between said cup sections.

15. In a half fruit peeler, the combination of means forming a relatively shallow cup adapted to hold a half fruit during peeling, a peeling head, means for relatively shifting said head and cup to register them and to cause said head and cup to be adjacently positioned, a knife on said head, means for arcuately moving said knife relatively to said head and through said cup to peel the half fruit, and a cup wall extension positioned in registration with a wall of the cup to cooperate with said knife during a portion of the peeling operation.

16. In a half fruit peeler, the combination of means forming a relatively shallow cup adapted to hold a half fruit during peeling, a peeling head shiftable toward and from said cup when in registration therewith, means for shifting said head, a knife on said head, means for arcuately moving said knife relatively to said head and through said cup to peel the half fruit, and a cup wall extension carried by said peeling head and adapted to be positioned in registration with a wall of the cup during a portion of the peeling operation, said cup comprising relatively movable sections and said extension being shiftably mounted on said head to permit relative cup movement while said extension is in contact with said cup sections.

17. In a half fruit peeler, the combination of means forming a relatively shallow cup adapted to hold a half fruit during peeling, a peeling head shiftable toward and from said cup when in registration therewith, means for shifting said head, a knife on said head, means for arcuately moving said knife relatively to said head and through said cup to peel the half fruit, and a cup wall extension carried by said peeling head and adapted to be positioned in registration with a wall of the cup during a portion of the peeling operation, said cup comprising a stationary section and a section pivoted thereto to swing toward and away therefrom while holding a half fruit, and said extension being mounted contactingly to overlie the shiftable section and being shiftable to permit movement of said shiftable cup section.

18. In a device for peeling a half fruit, the combination of a cup adapted to hold a half fruit during peeling, fruit peeling means, means for relatively shifting said peeling means and cup into registration and for causing said peeling means and cup to be adjacently disposed, means for arcuately moving said peeling means through said half fruit to peel the latter, and a cup wall extension shiftable relatively to said cup into registration with a wall portion of the cup to cooperate with the peeling means during a portion of the peeling operation.

19. In a device for peeling a half fruit, the combination of a cup adapted to hold a half fruit during peeling, said cup having relatively shiftable sections, peeling means, means for relatively shifting said peeling means and said cup into registration and for causing said peeling means and cup to be adjacently disposed, means for arcuately moving said peeling means in said cup to peel the half fruit, means providing relative movement between said cup sections during the peeling operation, a cup wall extension, means for shifting said extension relatively to said cup to position said extension in registration with a wall portion of the cup to cooperate with the peeling means during a portion of the peeling operation, and means adapting said extension for movement to allow a relative movement of said cup sections.

20. In an automatic machine for peeling peaches, the combination of means for holding a whole peach, means for cutting the peel from the stem cavity while said whole peach is held, means for severing the whole peach into halves, a pair of half peach holders, means for transferring each severed half into a holder, means for peeling each half peach while in said holder by an arcuate line of severance curving about an axis passing through and parallel to the longitudinal stem axis of the half peach, said line of cut merging with the cuts through and formed in the peel at the stem cavity.

21. In a fruit treating machine the combination of means forming a cup adapted to support a half fruit, cutting means for said half fruit, means for moving said cutting means through the flesh of the half fruit to cut the half fruit and means providing a cup wall extension positioned in registration with a walled cup during the cutting operation to support an edge of the half fruit during the cutting operation.

22. In a machine for treating a half fruit, the combination of a cup adapted to hold the half fruit, said cup having relatively shiftable sections, cutting means, means for arcuately moving said cutting means through said cup to cut the half fruit, means for causing a relative movement between the cup sections during the cutting operation, a cup wall extension registerable with a wall portion of the cup to support an edge of the half fruit during a portion of the cutting operation, and means for causing said cup wall extension to remain in registry with said wall portion of the cup upon relative movement of said cup sections.

23. In a machine for treating a half fruit, the combination of a cup adapted to hold the half fruit, said cup having relatively shiftable sections, cutting means, means for arcuately moving said cutting means through said cup to cut the half fruit, means for causing a relative movement between the cup sections during the cutting operation, a cup wall extension adapted to register with a wall portion of the cup during a portion of the cutting operation, means for shiftably mounting said cup wall extension to permit relative movement of said cup sections.

24. In an automatic machine for treating peaches, the combination of a rotatable turret having spaced means for receiving and holding a succession of whole peaches each with the suture plane of the peach when held being disposed parallel to the plane of action of a flesh and pit severing means, means for severing the flesh and pit of the held peach into halves along a plane parallel to the suture plane of the peach, a second turret having a plurality of spaced apart radially disposed holding means each adapted to receive a half peach, said holding means being equally spaced around the entire circumference of the turret, means for simultaneously conveying the two halves of each such severed whole peach in parallel paths while maintaining the halves in the same predetermined position they formerly occupied prior to severance, means for bodily swinging said halves about axes transverse and parallel to the turret axis to deposit one of said half peaches in each of two adjacent holding means of said radially extending holding means of the second turret with the cut face of the half peach uppermost and with the longer axis of the half pit substantially parallel to the projection of a radial axis of the turret through the holding means, arcuately movable peeling means operably related to said turret, and adapted to peel the half fruit while held in the holding means, the axis of arcuate movement of the peeling means being disposed parallel to the maximum longitudinal axis of the pit.

25. In an automatic machine for treating peaches, the combination of an intermittently rotatable turret having spaced means for receiving and holding a succession of whole peaches, each with its suture plane disposed vertically and centrally of the holding means and with the longitudinal pit axis of the peach disposed horizontally and radially of said turret, means for severing the flesh of the peach and pit along the suture plane of the peach, a second intermittently operable turret having a plurality of spaced apart radially disposed holding means, said holding means being equally spaced around the entire circumference of the turret, each adapted to receive a half peach when severed, means for simultaneously conveying the two halves of each such severed whole peach in parallel paths while maintaining the longitudinal pit axes of the half peaches in horizontal position and radially of said turrets, means for shifting said halves out of their former position simultaneously about axes transverse and parallel to the axis of the turret to deposit one of said half peaches in each of two adjacent ones of said radially extending holding means each of the second turret with the cut face of each half peach uppermost, and with the longitudinal pit axis extending radially of said second turret, peeling means operable when peeling the peach, about an axis disposed substantially parallel to the longitudinal axis of the pit for peeling the half peach in one of said holding means during the rest period of the second turret.

26. In an automatic machine, the combination of means comprising an intermittently operating turret having relatively shiftable power actuated gripping members adapted to shift relatively to fruit gripping position and constructed and arranged to receive and hold a succession of peaches, each peach being uniformly positioned with its suture plane vertical and parallel to a plane disposed radially of the turret, rotatable pit cutting means operable in a plane disposed radially of the turret and parallel to the axis of turning of the turret, means for intermittently shifting said turret to a position such that the suture plane of the gripped peach lies parallel with and relatively close to the plane of operation of the cutting means, means for bodily moving said cutting means in its plane of rotation to cause it to sever the flesh and pit of each peach while the peach is held in the turret holding means, said machine including a stem cavity trimmer disposed in a plane of actuation which registers with a radius of the fruit holding turret, means for advancing the fruit holding turret to the stem cavity trimmer intermittently prior to the shifting of the fruit holding turret to the cutting means, and means for actuating the stem cavity trimmer to cause it to operate in a plane parallel to a radial plane of the turret and parallel to the axis of turning of said turret for cutting the peel from the stem cavity of the whole peach prior to severing the peach into halves.

27. In combination, means providing an intermittently operating turret having means for holding a whole peach with its stem cavity exposed, means associated with the turret for entering said stem cavity for cutting free the peel of the peach in the stem cavity, means associated with the turret for splitting the peach through the pit and flesh along a plane parallel to the suture plane of the peach, means for holding each such severed half peach, and means for peeling each half by forming a line of severance through the flesh of the fruit substantially adjacent the peel, said line of severance starting at the cut face of the half fruit at the peel and passing about the curved surface beneath the peel and terminating at the opposite cut face of the half fruit whereby the entire peeling including the peeling at the stem cavity is removed.

28. In combination, means providing an intermittently operating turret provided with radially extending fruit holding means including relatively shiftable members adapted to hold a whole peach with its suture plane extending substantially radially of the turret, means providing a support, a supplemental holder and gauge shiftably mounted on said support, means for shifting the turret to bring the whole peach into the plane of action of said supplemental holder, means for shifting the supplemental holder toward the held peach and into the stem cavity thereof, a stem cavity peeler shiftably mounted on said support, and means for shifting said peeler, said peeler including a plurality of cutting blades adapted to sever the peel of the stem cavity while the peach is contacted in the stem cavity by said supplemental holder.

29. In combination, means providing an inter- mittently operating turret having means for holding a whole peach, means associated with the movement of the turret for entering the stem cavity of the peach to cut free the peel thereof prior to the main peeling operation, means associated with the intermittent movement of the turret for thereafter splitting the peach through the pit and flesh, means for holding each such severed half peach and means for peeling each half peach by forming a line of severance through the flesh of the fruit substantially adjacent to the peel, said line of severance starting at the cut face of the half fruit at the peel and passing arcuately about the curved surface beneath the peel and terminating at the opposite cut face of the half fruit, whereby the entire peeling, including the peeling at the stem cavity, is removed.

30. The method of peeling a whole peach comprising severing the peel from the peach at the stem cavity only, thereafter severing the peach and its pit along a plane substantially adjacent to and parallel with the plane of maximum cross-sectional area of the pit, thereafter peeling each half peach by arcuately cutting through the flesh of the peach just beneath the peel beginning and terminating at the cut face of the half peach on opposite sides of the pit whereby the second line of peeling severance merges with the lines of peeling severance formed in the stem cavity whereby completely to remove all of the peel of the peach.

31. In a machine for treating peaches, a peach feeding turret, stem cavity peeling means positioned to trim the peach fed thereto by the turret, means on said turret providing shiftably mounted peach gripping members adapted to engage opposite sides of the peach in the plane of its suture axis to prevent movement of the peach transversely to its suture plane whereby to hold the peach with its suture in predetermined position for the action of said stem cavity peeling means.

32. In combination, means providing an intermittently operable turret, said turret having a plurality of spaced, radially extending holding means in which are manually positioned a succession of whole peaches and whereby said peaches so positioned are held, said holding means each including power operated relatively shiftable members, said plane parallel to and extending through the central axis of rotation of said turret members of each holding means being shiftable toward and from each other in a plane extending radially of and through the axis of movement of the turret and adapted to hold the whole peach positioned therein with its suture line extending substantially radially of the turret and with the stem cavity of the whole peach outermost, means providing a stationary support, peeling means shiftably mounted on said support and operable in the stem cavity of a peach held in a holding means to peel the stem cavity of the peach, gauging means shiftably mounted with respect to said support for movement radially of the turret into contact with a peach within the stem cavity and operatively connected to said peeling means to position said peeling means with respect to the stem cavity of a peach held in a holding means, means for operating said turret intermittently to successively position the peaches in said holding means in the plane of action of said gauging means, and means for yieldingly shifting the gauging means into the stem cavity of a peach positioned in its plane of action and held in a holding means of the turret.

RAYMOND L. EWALD.
HENRY A. SKOG.

CERTIFICATE OF CORRECTION.

Patent No. 2,335,849.

December 7, 1943.

RAYMOND L. EWALD, ET AL.

It is hereby certified that error appears in the printed specification of the above numbered patent requiring correction as follows: Page 3, first column, line 10, strike out the words "stations and" and insert the same after "these" in line 11; page 11, second column, line 52, for "At" read --As--; page 12, second column, line 55, claim 2, for "elliptical-shaped" read --elliptically-shaped--; page 13, first column, line 9, claim 3, for "theh" before "body" read --the--; page 16, second column, lines 45 to 47 inclusive, claim 32, strike out "plane parallel to and extending through the central axis of rotation of said turret"; and that the said Letters Patent should be read with this correction therein that the same may conform to the record of the case in the Patent Office.

Signed and sealed this 28th day of March, A. D. 1944.

Leslie Frazer
Acting Commissioner of Patents.

(Seal)